US012717182B2

(12) United States Patent
Kim

(10) Patent No.: US 12,717,182 B2
(45) Date of Patent: Aug. 25, 2026

(54) OPTICAL PATH CONTROL MEMBER AND DRIVING METHOD THEREOF

(71) Applicant: LG INNOTEK CO., LTD., Seoul (KR)

(72) Inventor: Seung Jin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 65 days.

(21) Appl. No.: 18/845,697

(22) PCT Filed: Mar. 2, 2023

(86) PCT No.: PCT/KR2023/002862
§ 371 (c)(1),
(2) Date: Sep. 10, 2024

(87) PCT Pub. No.: WO2023/171977
PCT Pub. Date: Sep. 14, 2023

(65) Prior Publication Data

US 2025/0189836 A1 Jun. 12, 2025

(30) Foreign Application Priority Data

Mar. 11, 2022 (KR) ........................ 10-2022-0030498

(51) Int. Cl.
*G02F 1/13* (2006.01)
*G02F 1/133* (2006.01)
(Continued)

(52) U.S. Cl.
CPC ........ *G02F 1/13306* (2013.01); *G02F 1/1323* (2013.01); *G02F 1/167* (2013.01); *G02F 1/1685* (2019.01)

(58) Field of Classification Search
CPC .. G02F 1/13306; G02F 1/1685; G02F 1/1323; G02F 1/167; G02F 1/1335; G02F 1/137
See application file for complete search history.

(56) References Cited

U.S. PATENT DOCUMENTS 10,163,406 B2 12/2018 Sim et al.
12,117,679 B2 * 10/2024 Murata ............ G02F 1/134345
(Continued)

FOREIGN PATENT DOCUMENTS

CN 109991791 A * 7/2019 ............ G02F 1/167
CN 116381975 A * 7/2023 ............ H10K 50/85
(Continued)

OTHER PUBLICATIONS

International Search Report dated May 31, 2023 in International Application No. PCT/KR2023/002862.

*Primary Examiner* — Ricardo Osorio
(74) *Attorney, Agent, or Firm* — SALIWANCHIK, LLOYD & EISENSCHENK

(57) ABSTRACT

A method of driving an optical path control member includes a first step of turning on a power of the optical path control member in an initial mode; a second step of setting an application time of a first voltage applied to the optical path control member; and a third step of setting an application time of a second voltage applied to the optical path control member, wherein the second step includes: applying the first voltage of |a|V for $x_1$ seconds; determining whether a set first light transmittance is satisfied; and if the first light transmittance is not satisfied, applying the first voltage of |a|V for $x_2$ seconds; wherein the determining whether the first light transmittance is satisfied includes: if a light transmittance is 60% or more in a region where an user's field of view exceeds 45°, determining that the first light transmittance is satisfied, and if a light transmittance is less than 60% in the region where the user's field of view exceeds 45°, determining that the first light transmittance is not satisfied, wherein the third step includes: applying the second voltage of |b|V for $y_1$ seconds; determining whether a set second light transmittance is satisfied; and if the second light transmittance is not satisfied, applying the second (Continued)

voltage of |b|V for $y_2$ seconds, wherein the determining whether the second light transmittance is satisfied includes: If a light transmittance is less than 10% in a region where the user's field of view is less than 45°, determining that the second light transmittance is satisfied, and if a light transmittance is 10% or more in the region where the user's field of view exceeds 45°, determining that the second light transmittance is not satisfied.

16 Claims, 15 Drawing Sheets

(51) Int. Cl.
*G02F 1/167* (2019.01)
*G02F 1/1685* (2019.01)

(56) References Cited

U.S. PATENT DOCUMENTS

| | | | | |
|---|---|---|---|---|
| 2007/0052669 | A1 | 3/2007 | Zhou et al. | |
| 2019/0179208 | A1* | 6/2019 | Sato | G02F 1/1323 |
| 2023/0301157 | A1* | 9/2023 | Yamazaki | H05B 33/12 |
| 2023/0324728 | A1 | 10/2023 | Ju et al. | |

FOREIGN PATENT DOCUMENTS

| | | | | | |
|---|---|---|---|---|---|
| JP | 2018-205515 | A | | 12/2018 | |
| JP | 7145738 | B2 | * | 10/2022 | G02F 1/1323 |
| KR | 10-2005-0116160 | A | | 12/2005 | |
| KR | 10-2006-0133965 | A | | 12/2006 | |
| KR | 10-2017-0110657 | A | | 10/2017 | |
| KR | 10-2021-0110261 | A | | 9/2021 | |
| KR | 10-2021-0136836 | A | | 11/2021 | |
| WO | WO-2021210834 | A1 | * | 10/2021 | G02F 1/1685 |
| WO | 2022/050746 | A1 | | 3/2022 | |

* cited by examiner

VIEWING DIRECTION
1300
2100
2000
2200
1500
120
220
420
300
410
210
110
3000
320
330b
330a
330
310

VIEWING DIRECTION
2000
210
110
1500
2200
2100
1300
420
330a
300
410
310
320
330b
220
120

PRIVACY MODE

OPTICAL PATH CONTROL MEMBER AND DRIVING METHOD THEREOF

CROSS-REFERENCE TO RELATED APPLICATIONS

This application is the U.S. national stage application of International Patent Application No. PCT/KR2023/002862, filed Mar. 2, 2023, which claims the benefit under 35 U.S.C. § 119 of Korean Application No. 10-2022-0030498, filed Mar. 11, 2022, the disclosures of each of which are incorporated herein by reference in their entirety.

TECHNICAL FIELD

An embodiment relates to an optical path control member and a driving method thereof.

BACKGROUND ART

A light blocking film blocks transmitting of light from a light source, and is attached to a front surface of a display panel which is a display device used for a mobile phone, a notebook, a tablet PC, a vehicle navigation device, a vehicle touch, etc., so that the light blocking film adjusts a viewing angle of light according to an incident angle of light to express a clear image quality at a viewing angle needed by a user when the display transmits a screen.

In addition, the light blocking film may be used for the window of a vehicle, building or the like to shield outside light partially to inhibit glare, or to inhibit the inside from being visible from the outside.

That is, the light blocking film may be an optical path control member that controls the movement path of light to block light in a specific direction and transmit light in a specific direction. Accordingly, it is possible to control the viewing angle of the user by controlling a transmission angle of the light by the light blocking film.

Meanwhile, such a light blocking film may be divided into a light blocking film that can always control the viewing angle regardless of the surrounding environment or the user's environment and a switchable light blocking film that allow the user to turn on/off the viewing angle control according to the surrounding environment or the user's environment.

Such a switchable light blocking film may be implemented by filling a light conversion material including particles that can move as a voltage is applied to the receiving part and a dispersion that disperses the particles, and changing the receiving part to a light transmitting part and a light blocking part by dispersion and aggregation of the particles.

In detail, the particles move in a height direction of the receiving part of the switchable light blocking film by applying a voltage. As a result, the receiving part is changed to a light transmitting part or a light blocking part.

The particles may be agglomerated with each other by repeated movement. Alternatively, the particles may harden. Therefore, if used for a long time, the speed of particles moving by the same voltage may vary. Accordingly, there is a problem in that driving characteristics of the optical path control member are reduced.

Accordingly, in order to solve the above problems, an optical path control member having a new structure is required.

DISCLOSURE

Technical Problem

The embodiment relates to an optical path control member capable of inhibiting particle sedimentation and a method for driving the same.

The embodiment relates to an optical path control member having improved driving characteristics and a method for driving the same.

Technical Solution

A method of driving an optical path control member includes a first step of turning on a power of the optical path control member in an initial mode; a second step of setting an application time of a first voltage applied to the optical path control member; and a third step of setting an application time of a second voltage applied to the optical path control member, wherein the second step includes: applying the first voltage of |a|V for $x_1$ seconds; determining whether a set first light transmittance is satisfied; and if the first light transmittance is not satisfied, applying the first voltage of |a|V for $x_2$ seconds; wherein the determining whether the first light transmittance is satisfied includes: if a light transmittance is 60% or more in a region where an user's field of view exceeds 45°, determining that the first light transmittance is satisfied, and if a light transmittance is less than 60% in the region where the user's field of view exceeds 45°, determining that the first light transmittance is not satisfied, wherein the third step includes: applying the second voltage of |b|V for $y_1$ seconds; determining whether a set second light transmittance is satisfied; and if the second light transmittance is not satisfied, applying the second voltage of |b|V for $y_2$ seconds, wherein the determining whether the second light transmittance is satisfied includes: If a light transmittance is less than 10% in a region where the user's field of view is less than 45°, determining that the second light transmittance is satisfied, and if a light transmittance is 10% or more in the region where the user's field of view exceeds 45°, determining that the second light transmittance is not satisfied.

Advantageous Effects

The driving method of the optical path control member according to an embodiment includes a step of correcting an application time of a voltage.

When characteristics of the light conversion particles change during use of the optical path control member, it is possible to inhibit the driving characteristics of the optical path control member from decreasing due to the change in a driving speed of the light conversion particles.

As time passes, the light conversion particles are agglomerated with each other. As a result, a weight of the light conversion particles disposed inside a receiving part may be changed. Accordingly, the driving speed of the optical path control member may be reduced. In addition, when a voltage is applied at the same time, a moving length of the light conversion particles may be changed. Accordingly, the optical path control member may have a non-uniform light transmittance in each mode.

Accordingly, a driving method of the optical path control member according to an embodiment includes a step of correcting a magnitude of a voltage or an application time of the voltage. Accordingly, the optical path control member may have a uniform driving speed. Also, the optical path control member may have a uniform light transmittance in each mode.

Accordingly, the user may use an optical path control member having improved driving speed and driving characteristics.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", or "coupled" to another element, it may include not only when the element is directly "connected" to, or "coupled" to other elements, but also when the element is "connected", or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member and a method of driving the same according to an embodiment will be described with reference to the drawings.

Figure 1:
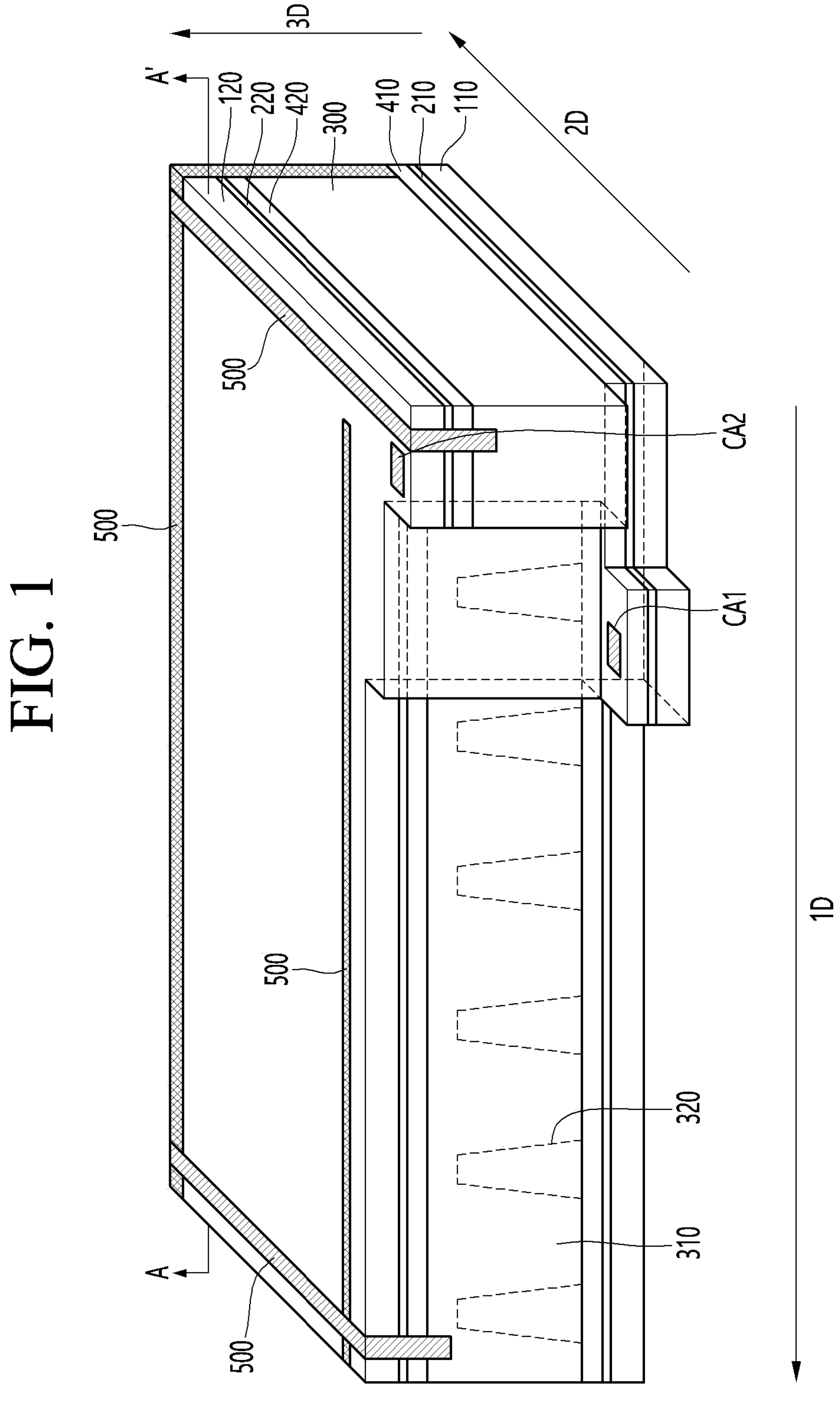
FIG. 1 is a view showing a perspective view of an optical path control member according to an embodiment.
Figure 2:
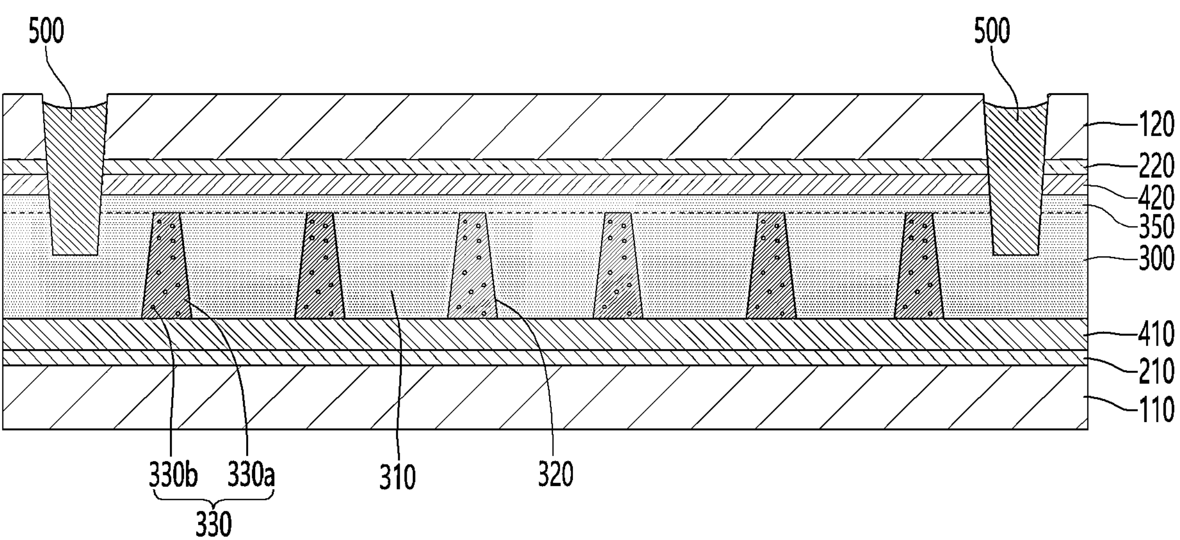
FIGS. 2 and 3 are cross-sectional views taken along line A-A' of FIG. 1.
Figure 3:
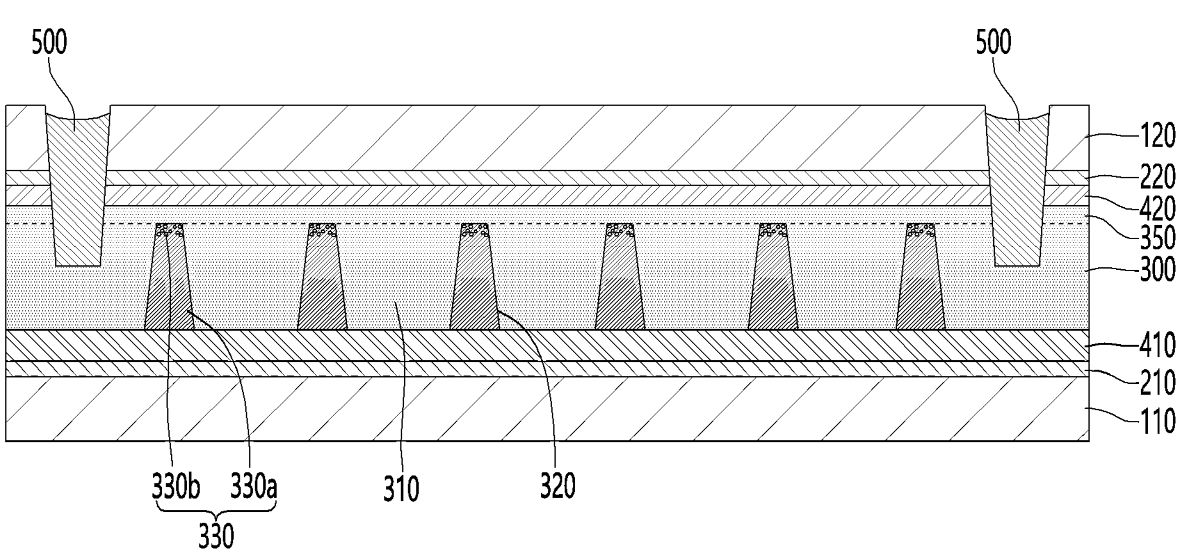

FIGS. 1 to 3 are views for explaining an optical path control member according to an embodiment.

Referring to FIG. 1, an optical path control member 1000 according to an embodiment may include a first substrate 110, a second substrate 120, a first electrode 210, a second electrode 220, and a light conversion unit 300.

The first substrate 110 may support the first electrode 210. The first substrate 110 may be rigid or flexible. Additionally, the second substrate 120 supports the second electrode 220.

In addition, at least one of the first substrate 110 and the second substrate 120 may be transparent. For example, at least one of the first substrate 110 and the second substrate 120 may include a transparent substrate capable of transmitting light.

At least one of the first substrate 110 and the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, at least one of the first substrate 110 and the second substrate 120 may be a flexible substrate having flexible characteristics.

In addition, at least one of the first substrate 110 and the second substrate 120 may be a curved or bended substrate. That is, the optical path control member including at least one of the first substrate 110 and the second substrate 120 may also be formed to have flexible, curved, or bent characteristics. Accordingly, the optical path control member according to the embodiment may be changed to various designs.

The first substrate 110 and the second substrate 120 may extend in a first direction 1A, a second direction 2A, and a third direction 3A.

The first direction 1D corresponds to a longitudinal or width direction of the first substrate 110 and the second substrate 120. The second direction 2D corresponds to the longitudinal or width direction of the first substrate 110 and the second substrate 120. Also, the second direction 2D extends in a direction different from the first direction 1D. The third direction 3D corresponds to a thickness direction of the first substrate 110 and the second substrate 120. Also, the third direction 3D extends in a direction different from the first direction 1D and the second direction 2D.

For example, the first direction 1D may be defined in a longitudinal direction of the first substrate 110 and the second substrate 120. Also, the second direction 2D may be defined in a width direction of the first substrate 110 and the second substrate 120. Also, the third direction 3D may be defined in a thickness direction of the first substrate 110 and the second substrate 120.

Alternatively, the first direction 1D may be defined in a width direction of the first substrate 110 and the second substrate 120. Also, the second direction 2D may be defined in a longitudinal direction of the first substrate 110 and the second substrate 120. Also, the third direction 3D may be defined in a thickness direction of the first substrate 110 and the second substrate 120.

Hereinafter, for convenience of description, the first direction 1D is defined in the longitudinal directions of the first substrate 110 and the second substrate 120. Also, the second direction 2D is defined in the width directions of the first substrate 110 and the second substrate 120. Also, the third direction 3D is defined in the thickness directions of the first substrate 110 and the second substrate 120.

The first substrate 110 and the second substrate 120 may have a thickness within a set range. For example, the first substrate 110 and the second substrate 120 may have a thickness of 25 um to 150 um.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

In addition, the second electrode 220 is disposed on one surface of the second substrate 120. Specifically, the second electrode 220 is disposed on a lower surface of the second substrate 120. That is, the second electrode 220 is disposed between the first substrate 110 and the second substrate 120. In addition, the second electrode 220 faces the first electrode 210.

At least one of the first electrode 210 and the second electrode 220 may include a transparent conductive material. For example, at least one of the first electrode 210 and the second electrode 220 may include a conductive material having a light transmittance of about 80% or more. For example, at least one of the first electrode 210 and the second electrode 220 may include a metal oxide such as indium tin oxide, indium zinc oxide, copper oxide, tin oxide, zinc oxide, titanium oxide, etc.

The first electrode 210 and the second electrode 220 may have a thickness of 10 nm to 300 nm.

At least one of the first electrode 210 and the second electrode 220 may include various metals to realize low resistance. For example, at least one of the first electrode 210 and the second electrode 220 may include at least one metal of chromium (Cr), nickel (Ni), copper (Cu), aluminum (Al), silver (Ag), molybdenum (Mo). Gold (Au), titanium (Ti), and alloys thereof.

The first electrode 210 and the second electrode 220 may be disposed on the entire surface of one surface of the first substrate 110 and the second substrate 120, respectively. In detail, the first electrode 210 may be disposed as a surface electrode on one surface of the first substrate 110. Specifically, the first electrode 210 and the second electrode 220 may be disposed as surface electrodes on one surface of the first substrate 110 and the second substrate 120, respectively.

Alternatively, the first electrode 210 and the second electrode 220 may be disposed on one surfaces of the first substrate 110 and the second substrate 120, respectively, as pattern electrodes. That is, the first electrode 210 and the second electrode 220 may be disposed on one surfaces of the first substrate 110 and the second substrate 120, respectively, as a plurality of pattern electrodes spaced apart from each other.

In addition, at least one of the first electrode 210 and the second electrode 220 may be formed as a mesh-shaped electrode including an opening.

Accordingly, even if at least one of the first electrode 210 and the second electrode 220 includes metal, the electrode is not visually recognized from the outside. Accordingly, the user's visibility is improved. In addition, the optical path control member has an increased light transmittance by the openings. Accordingly, a luminance of the optical path control member is improved.

In detail, the first substrate 110 and the second substrate 120 may include protrusion. Specifically, the first substrate 110 includes a first protrusion. Also, the second substrate 120 includes a second protrusion.

The first protrusion and the second protrusion include a connection region. The connection region is a region connected to an external printed circuit board or a flexible printed circuit board.

Specifically, the first protrusion includes a first connection region CA1. Also, the second protrusion includes a second connection region CA2.

A conductive material is exposed on the upper surface of the first connection region CA1 and the upper surface of the second connection region CA2. For example, the first electrode 210 is exposed in the first connection region CA1. Also, a conductive material may be exposed in the second connection region CA2. A cutting region is formed in the second protrusion. The conductive material is filled in the cutting region. Accordingly, the second connection region CA2 is formed on the second protrusion.

The optical path control member is electrically connected to an external printed circuit board or a flexible printed circuit board by the first connection region CA1 and the second connection region CA2.

A light conversion unit 300 is disposed between the first substrate 110 and the second substrate 120. Specifically, the light conversion unit 300 is disposed between the first electrode 210 and the second electrode 220.

An adhesive layer 410 is disposed between the first electrode 210 and the light conversion unit 300. Accordingly, the first substrate 110 and the light conversion unit 300 are adhered to each other. Also, a buffer layer 420 is disposed between the second electrode 220 and the light conversion unit 300. Accordingly, the adhesion between the second electrode 220 including different materials and the light conversion unit 300 is improved.

Thus, the first substrate 110, the second substrate 120, and the light conversion unit 300 are adhered by the adhesive layer 410 and the buffer layer 420.

The light conversion part 300 includes a plurality of partition wall parts 310 and a receiving part 320. A light conversion particle and a dispersion are disposed in the receiving part 320. The light conversion particles move by an application of a voltage. A light transmission characteristic of the optical path control member is changed by the movement of the light conversion particles. Also, the dispersion disperses the light conversion particles.

The second substrate 120 includes a plurality of cutting regions. The cutting region is filled with a sealing material, thereby forming a plurality of sealing parts 500. The light conversion material 330 disposed inside the receiving part 320 is sealed by the sealing part 500.

FIGS. 2 and 3 are cross-sectional views taken along line A-A' of FIG. 1.

Referring to FIGS. 2 and 3, the light conversion unit 300 may include a partition wall part 310 and a receiving part 320.

The partition wall part 310 may be defined as a partition wall region that separates a plurality of receiving parts. The partition wall part 310 can transmit light. That is, light emitted from the direction of the first substrate 110 or the second substrate 120 may pass through the partition wall part.

The partition wall part 310 and the receiving part 320 may be arranged at different widths. For example, the width of the partition wall part 310 may be greater than the width of the receiving part 320.

In addition, the receiving part 320 may be formed in a shape whose width narrows while extending from the first electrode 210 toward the second electrode 220.

The partition wall part 310 and the receiving part 320 may be arranged alternately. That is, each partition wall part 310 is disposed between the receiving parts 320 adjacent to each other. In addition, each receiving part 320 is disposed between the partition wall parts 310 adjacent to each other.

The partition wall part 310 may include a transparent material. The partition wall part 310 may include a material capable of transmitting light.

The partition wall part 310 may include a resin material. For example, the partition wall part 310 may include a photocurable resin material. For example, the partition wall part 310 may include UV resin or transparent photoresist resin. Alternatively, the partition wall part 310 may include urethane resin or acrylic resin.

The receiving part 320 may be formed to partially penetrate the light conversion unit 300. Accordingly, the receiving part 320 is disposed in contact with the adhesive layer 410. In addition, the receiving part 3200 is disposed to be spaced apart from the buffer layer 420. Accordingly, a base part 350 may be formed between the receiving part 320 and the buffer layer 420.

A light conversion material 330 may be disposed in the receiving part 320. The light conversion material 330 includes light conversion particles 330*a* and a dispersion liquid 330*b* in which the light conversion particles 330*a* are dispersed.

The dispersion liquid 330*b* may disperse the light conversion particles 330*a*. The dispersion liquid 330*b* may include a transparent material. The dispersion liquid 330*b* may include a non-polar solvent. In addition, the dispersion liquid 330*b* may include a light-transmitting material. For example, the dispersion 330*b* may include at least one of halocarbon oil, paraffin oil, and isopropyl alcohol.

The light conversion particles 330*b* are dispersed in the dispersion liquid 330*a*.

The light conversion particles 330*a* may include a material capable of absorbing light. That is, the light conversion particles 330*a* may be light absorbing particles. In addition, the light conversion particles 330*a* may have a color. For example, the light conversion particles 330*a* may have a black-based color. For example, the light conversion particles 330*a* may include carbon black particles.

The light conversion particles 330*a* may have a polarity by charging a surface thereof. For example, the surface of the light conversion particles 330*a* may be charged with a negative (−) charge. Accordingly, according to the application of the voltage, the light conversion particles 330*a* may move toward the first electrode 210 or the second electrode 220.

The light transmittance of the receiving part 320 is changed by the movement of the light conversion particle 330*b*. Accordingly, the receiving part 320 is changed into a light blocking part and a light transmitting part. Specifically, the light transmittance of the receiving part 320 is changed by the dispersion and aggregation of the light conversion particles 330*b*.

For example, the optical path control member according to the embodiment may be driven in an initial mode, a first mode, a second mode, and a rest mode depending on whether a voltage is applied.

The initial mode is defined in a state in which power of the optical path control member is turned off. That is, in the initial mode, a voltage is not applied to the optical path control member.

In the initial mode, the light conversion particles 330*b* are dispersed in the receiving part 320 as shown in FIG. 2. Accordingly, the optical path control member operates as a light blocking part. That is, in the initial mode, the user's viewing angle is controlled at a set angle.

Accordingly, in the initial mode, a screen of a display including the optical path control member may be visually recognized only at a viewing angle within a set range. That is, in the initial mode, the receiving part 320 becomes a light blocking part. Accordingly, the optical path control member transmits light within a range set by the receiving part 320. Also, the optical path control member blocks light at an angle other than a range set by the receiving part 320. That is, in the initial mode, the viewing angle of the user viewed from the outside is narrowed. Accordingly, the optical path control member is driven in a privacy mode.

The first mode is defined as a state in which the optical path control member is powered on. That is, in the first mode, a first voltage within a range set to the optical path control member is applied.

In the first mode, the light conversion particle 330*b* is moved in one direction within the receiving part 320. Specifically, in the first mode, the light conversion particle 330*b* is moved in a direction of any one of the first electrode 210 and the second electrode 220. For example, the light conversion particle 330*b* is moved in the direction of the second electrode 220 to which a voltage having an opposite polarity to that of the light conversion particle 330*b* is applied.

Accordingly, the optical path control member operates as a light transmitting part as shown in FIG. 3. That is, in the first mode, the viewing angle of the user is not limited. Accordingly, in the first mode, the viewing angle of the display including the optical path control member is not limited. That is, in the first mode, the viewing angle of the user is not limited, and thus, the optical path control member is driven in a public mode.

The second mode is defined in a state in which the optical path control member is powered on. That is, in the second mode, a second voltage within a range set in the optical path control member is applied. A magnitude of the first voltage may be different from a magnitude of the second voltage. Alternatively, a polarity of the first voltage may be different from a polarity of the second voltage.

In the second mode, the light conversion particle 330*b* is moved in one direction inside the receiving part 320. Specifically, in the second mode, the light conversion particle 330*b* is moved in the direction of any one of the first electrode 210 and the second electrode 220. For example, the light conversion particle 330*b* which has moved in the direction of the second electrode 220 may move in the direction of the first electrode 210. Accordingly, the light conversion particle 330*b* is dispersed in the receiving part 320. That is, in the second mode, the light conversion particle 330*b* is dispersed in the receiving part 320 similar to the initial mode.

Accordingly, the optical path control member operates as the light blocking part as shown in FIG. 2. That is, in the second mode, the viewing angle of the user is limited. Accordingly, in the second mode, the viewing angle of the user viewed from the outside is narrowed. Accordingly, the optical path control member is driven in the privacy mode.

The rest mode is defined as a state in which power of the optical path control member is turned on. That is, in the rest mode, a voltage is not applied to the optical path control member. That is, the rest mode is a mode in which a voltage of 0 V is applied while power of the optical path control member is turned on.

The rest mode may be a mode after the first mode. Alternatively, the rest mode may be a mode after the second mode. For example, the optical path control member may be driven in the order of an initial mode, a first mode, a rest mode, a second mode and a rest mode. That is, the rest mode may maintain a state of the first mode. Alternatively, the rest mode may maintain a state of the second mode. Accordingly, in the rest mode, the optical path control member is driven in a privacy mode or a public mode.

Meanwhile, as the switching of the mode is repeated, the light conversion particles **330*b* move repeatedly in the dispersion liquid 330*a*. Accordingly, the light conversion particles 330*b* may be agglomerated. Accordingly, a weight of the light conversion particles 330*b* disposed in the dispersion liquid 330*a* may be changed. Accordingly, a moving speed of the light conversion particles 330*b*** may be changed at the same voltage level while the optical path control member is repeatedly driven. Accordingly, as time passes, the light transmission characteristics of the optical path control member may become non-uniform in the first mode and the second mode. Accordingly, the driving characteristics of the optical path control member may be reduced.

For example, a time to switch from the initial mode to the first mode may be lengthened. Alternatively, a time to switch from the first mode to the second mode may be lengthened.

In addition, when switching from the initial mode to the first mode, the light transmittance of the optical path control member may change. Alternatively, when switching from the first mode to the second mode, the light transmittance of the optical path control member may be changed. Accordingly, the user's visibility may be reduced.

Hereinafter, a driving method of the optical path control member capable of solving the above problems will be described.

Figure 4:
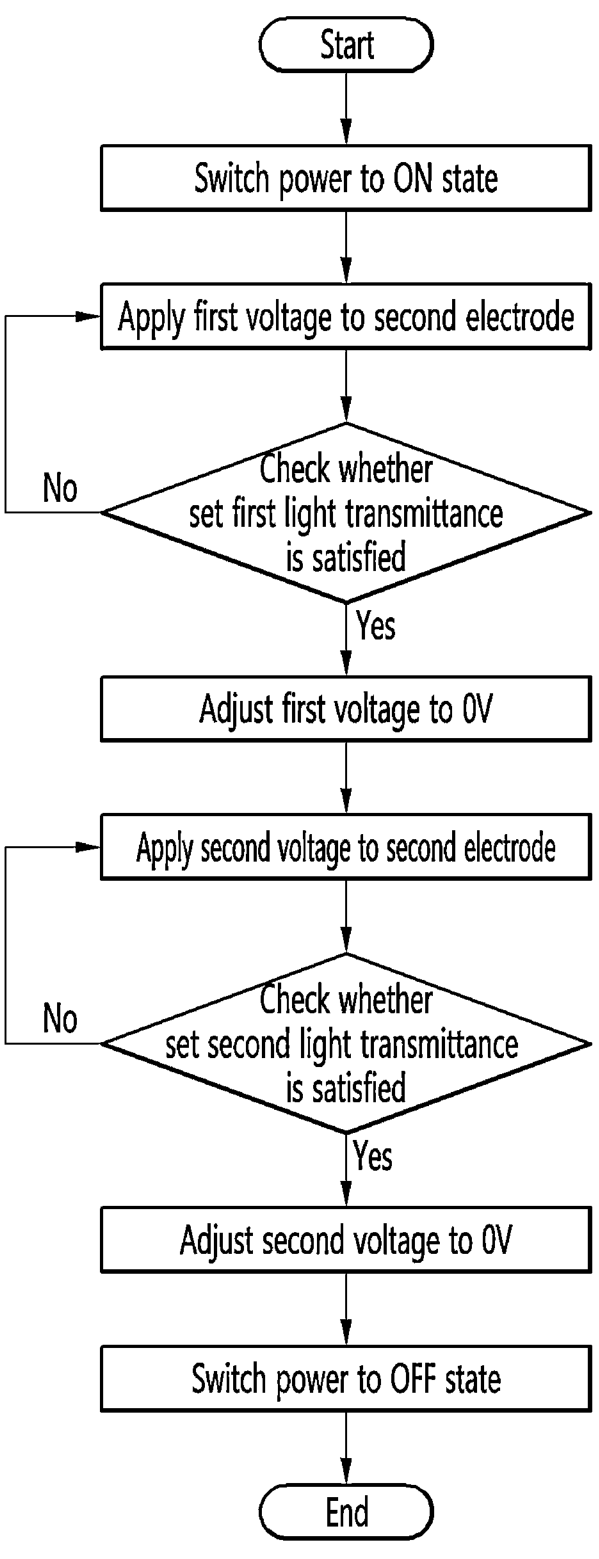
FIGS. 4 to 10 are views for explaining a method of driving an optical path control member according to embodiments.

FIG. 4 is a flowchart of a driving method of the optical path control member according to the first embodiment.

Referring to FIG. 4, the driving method of the optical path control member according to a first embodiment may include a first step of changing power of the optical path control member to an on state, a second step of applying a first voltage to a second electrode, a second-first step of checking whether the set first light transmittance is satisfied, a second-second step of adjusting the first voltage to 0V, a third-first step of applying a second voltage to the second electrode, a third-second step of determining whether a set second light transmittance is satisfied, a third-third step of adjusting the second voltage to 0V, and a fourth step of switching power of the optical path control member to an off state. The steps may be sequentially performed.

In the first step, power of the optical path control member 1000 is switched to an on state. Specifically, the power of the optical path control member in an initial mode is switched to the on state. For example, a power supply unit of the optical path control member 1000 is switched to the on state. Alternatively, a power supply unit connected to the optical path control member by the connector is switched to the on state.

Accordingly, the power of the optical path control member 1000 is turned on. Accordingly, the optical path control member 1000 is prepared in a state in which a voltage may be applied to the first electrode or the second electrode. In this case, the optical path control member 1000 is in a privacy mode state, which is an initial mode.

Subsequently, the second step proceeds. In the second step, the first voltage is set so that a transmittance of the optical path control member satisfies a first light transmittance. In detail, in the second step, a time for applying a voltage for the light transmittance of the optical path control member to satisfy the first light transmittance is set.

The second step includes a second-first step of applying the first voltage to the second electrode, a second-second step of determining whether the set first light transmittance is satisfied, and a second-third step of adjusting the first voltage to 0V.

In the second-first step, a voltage is applied by a power supply unit of the optical path control member 1000 or an external power supply unit connected to the optical path control member 1000. Specifically, a first voltage having a positive (+) polarity is applied to the second electrode 220 while the first electrode 210 is maintained in a ground electrode state. Accordingly, the light conversion particle **330*b* is moved in a direction toward the first electrode by a repulsive force with respect to the second electrode 220. For example, a positive voltage of $|a|$V may be applied to the second electrode 220**.

In the second step, a time for applying the first voltage to the second electrode 220 is set. First, a first voltage of $|a|$V is applied to the second electrode 220 with a time of $x_1$ seconds. Subsequently, a light transmittance of the optical path control member is measured. The light transmittance is measured with a known luminance meter.

Next, it is checked whether the set first light transmittance is satisfied. The first light transmittance is defined as a light transmittance implemented in the public mode of the optical path control member. For example, in the second-second step, if the light transmittance is 60% or more in a region where a viewing angle of an user is greater than 45°, it is defined as satisfying the first light transmittance. In addition, if the light transmittance is less than 60% in a region where the viewing angle of the user is greater than 45°, it is defined as not satisfying the above first light transmittance.

If the optical path control member satisfies a set first light transmittance, the first voltage is adjusted to 0V. Accordingly, the optical path control member is switched from an initial mode of a privacy mode to a first mode of a public mode. Subsequently, the optical path control member is switched to a rest mode in which the public mode is maintained. In this case, an application time of the first voltage of the optical path control member is set to $x_1$ seconds.

If the optical path control member does not satisfy the set first light transmittance, a process returns to the second-first step. Subsequently, a first voltage of $|a|$V is applied to the second electrode 220 for a time of x' seconds. That is, the process is repeated until the optical path control member satisfies the set first light transmittance. Accordingly, when the first voltage of $|a|$V is applied, the application time of the first voltage satisfying the first light transmittance is set by the optical path control member. If the first light transmittance is satisfied by applying the first voltage of $|a|$V for a time of $x_2$ seconds, the application time of the first voltage of the optical path control member is set to x1+x2 seconds.

If the optical path control member satisfies the set first light transmittance by the process, the first voltage may be adjusted to 0V. Accordingly, the optical path control member is switched from the initial mode of the privacy mode to the first mode of the public mode. Subsequently, the optical path control member is switched to the rest mode in which the public mode is maintained.

Subsequently, the third step proceeds. In detail, in the third step, the second voltage is set so that the light transmittance of the optical path control member satisfies a second light transmittance. In detail, in the third step, a time for applying a voltage for the light transmittance of the optical path control member to satisfy the second light transmittance is set.

The third step includes a third-first step of applying a second voltage to the second electrode, a third-second step of checking whether the set second light transmittance is satisfied, and a third-third step of adjusting the second voltage to 0V.

In the third-first step, a voltage is applied by a power supply unit of the optical path control member 1000 or an external power supply unit connected to the optical path control member 1000. Specifically, a first voltage having a negative (−) polarity is applied to the second electrode 220 while the first electrode 210 is maintained in a ground electrode state. Accordingly, the light conversion particles 330*b* are moved and dispersed in a direction toward the second electrode by the attraction with the second electrode 220. For example, a negative voltage of |b|V may be applied to the second electrode 220.

In the third step, a time for applying the second voltage to the second electrode 220 is set. First, a second voltage of |b|V is applied to the second electrode 220 with a time of $y_1$ seconds. Subsequently, a light transmittance of the optical path control member is measured. The light transmittance is measured with a known luminance meter.

Next, it is checked whether the set second light transmittance is satisfied. The second light transmittance is defined as a light transmittance implemented in the privacy mode of the optical path control member. For example, in the third-second step, if the light transmittance is 10% or less in a region where the viewing angle of the user is 45° or less, it is defined as satisfying the second light transmittance. In addition, if the light transmittance is greater than 10% in a region where the viewing angle of the user is 45° or less, it is defined as not satisfying the second light transmittance.

If the optical path control member satisfies the set second light transmittance, the second voltage is converted to 0 V. Accordingly, the optical path control member is switched from the first mode, which is the public mode, to the second mode, which is the privacy mode. Subsequently, the mode is switched to the rest mode, which maintains the privacy mode. In this case, an application time of the second voltage of the optical path control member is set to $y_1$ second.

If the optical path control member does not satisfy the set second light transmittance, the process returns to the third-first step. Subsequently, a second voltage of |b|V is applied to the second electrode 220 for a time of y' seconds. That is, the process is repeated until the optical path control member satisfies the set second light transmittance. Thereby, when the second voltage of |b|V is applied, an application time of the second voltage satisfying the second light transmittance is set. If the second light transmittance is satisfied by applying the second voltage of b|V for a time of $y_2$ seconds, the application time of the second voltage of the optical path control member is set to y1+y2 seconds.

If the optical path control member satisfies the second light transmittance set by the process, the second voltage may be converted to 0V. Accordingly, the optical path control member is switched from the first mode, which is the public mode, to the second mode, which is the privacy mode. Subsequently, it is switched to the rest mode, which maintains the privacy mode.

The optical path control member according to the embodiment may satisfy a light transmittance to be implemented in a public mode and a privacy mode. An amount of light conversion particles disposed in each receiving part may be different. In addition, each optical path control member may include light conversion particles having different particle diameters, weights, or materials.

The optical path control member according to an embodiment may set a light transmittance of a public mode and a privacy mode in consideration of a difference between the light conversion particles. Accordingly, an voltage application time that satisfies the set light transmittance before the user uses the optical path control member for a first time is adjusted. Furthermore, when the user uses the optical path control member later, the optical path control member may be used at a light transmittance suitable for each mode.

Figure 5:
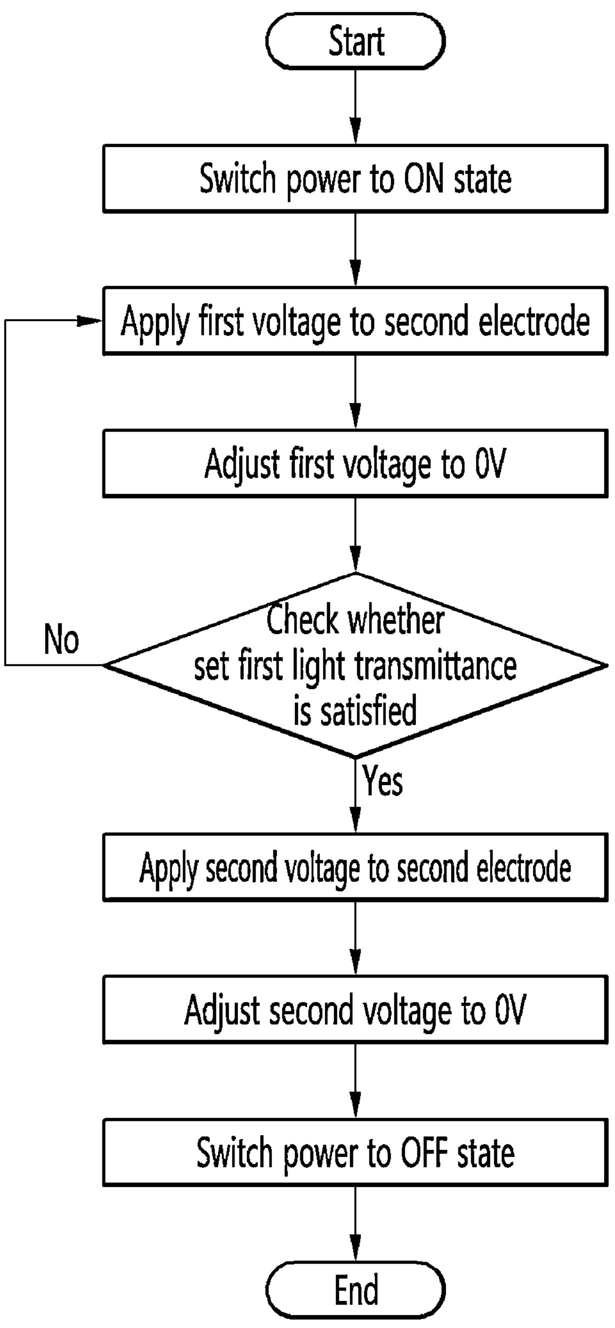

FIG. 5 is a flowchart of a method for driving the optical path control member according to a second embodiment. In the description of the method for driving the optical path control member according to the second embodiment, a description similar to the description of the method for driving the optical path control member according to the first embodiment described above will be omitted.

Referring to FIG. 5, a method of driving the optical path control member according to a second embodiment includes a first step of changing power of the optical path control member to an on state, a second-first step of applying a first voltage to a second electrode, a second-second step of adjusting the first voltage to 0V, a second-third step of checking whether a predetermined first light transmittance is satisfied, a third-first step of applying a second voltage to the second electrode, a third-second step of adjusting a second voltage to 0V, and a third-third step of switching power of the optical path control member to an off state. The steps are sequentially performed.

In the first step, the power of the optical path control member 1000 is switched to an on state. Specifically, a power supply unit of the optical path control member 1000 is switched to an on state. Alternatively, the power supply unit connected to the optical path control member by the connector is switched to an on state.

Accordingly, the power of the optical path control member 1000 is turned on. Accordingly, it is prepared in a state in which a voltage may be applied to the first electrode or the second electrode.

Subsequently, the second step proceeds. In the second step, the first voltage applied to the second electrode 220 of the optical path control member 1000 is corrected. In detail, in the second step, the first voltage is corrected so that the light transmittance of the optical path control member satisfies the first light transmittance. In more detail, in the second step, an application time of the first voltage is corrected so that the light transmittance of the optical path control member satisfies the first light transmittance.

The second step includes a second-first step of applying the first voltage to the second electrode, a second-second step of converting the first voltage to 0V, and a second-third step of checking whether the set first light transmittance is satisfied.

In the second-first step, a voltage is applied by a power supply unit of the optical path control member 1000 or an external power supply unit connected to the optical path control member 1000. Specifically, a first voltage having a positive (+) polarity is applied to the second electrode 220 while the first electrode 210 is maintained in a ground electrode state. Accordingly, the light conversion particle 330*b* is moved in a direction toward the first electrode by a repulsive force with respect to the second electrode 220. For example, a positive voltage of |a|V may be applied to the second electrode 220 for a time of X1 seconds (x1 seconds or x1+x2 seconds).

Subsequently, the first voltage is converted to 0V Accordingly, the optical path control member is switched from the initial mode which is the privacy mode to the first mode which is the public mode. Subsequently, the optical path control member is switched to the rest mode which maintains the public mode.

Subsequently, in the second-third step, it is checked whether a light transmittance in the rest mode satisfies the first light transmittance. The light transmittance is measured with a known luminance meter.

The first light transmittance is defined as a light transmittance implemented in the public mode of the optical path control member.

If the optical path control member satisfies the set first light transmittance, the optical path control member maintains a rest mode, which is a public mode.

If the optical path control member does not satisfy the set first light transmittance, the process returns to the second-first step. Subsequently, a first voltage of |a|V is applied to the second electrode 220 with a time of x3 seconds. Then, the first voltage is converted to 0V Subsequently, the light transmittance of the optical path control member and the first light transmittance are compared.

If the first light transmittance is satisfied by applying the first voltage of |a|V for a time of x3 seconds, an application time of the first voltage of the optical path control member is corrected to X2 seconds (x1+x3 seconds or x1+x2+x3 seconds).

That is, the process is repeated until the light transmittance of the optical path control member satisfies a set first light transmittance. Accordingly, when the first voltage of |a|V is applied, an application time of the first voltage satisfying the first light transmittance is corrected. In addition, the optical path control member maintains a rest mode of the public mode having the first light transmittance.

Subsequently, the third-first step and third-second step are performed.

In the third-first step, a voltage is applied through a power supply unit of the optical path control member 1000 or an external power supply unit connected to the optical path control member. Specifically, a first voltage having a negative (−) polarity is applied to the second electrode 220 while the first electrode 210 is maintained in a ground electrode state. Accordingly, the light conversion particle 330*b* is moved and dispersed in a direction toward the second electrode by the attractive force with the second electrode 220. For example, a negative voltage having a voltage magnitude of |b|V may be applied to the second electrode 220. For example, the second voltage set in the first embodiment described above may be applied to the second electrode 220 for a set application time. For example, a negative voltage of |b|V may be applied to the second electrode 220 for an application time of Y1 seconds (y1 seconds or y1+y2 seconds).

Subsequently, the second voltage may be converted to 0V. Accordingly, the optical path control member is switched from the first mode, which is the public mode, to the second mode, which is the privacy mode. Subsequently, the optical path control member is switched to the rest mode, which maintains the privacy mode.

Figure 6:
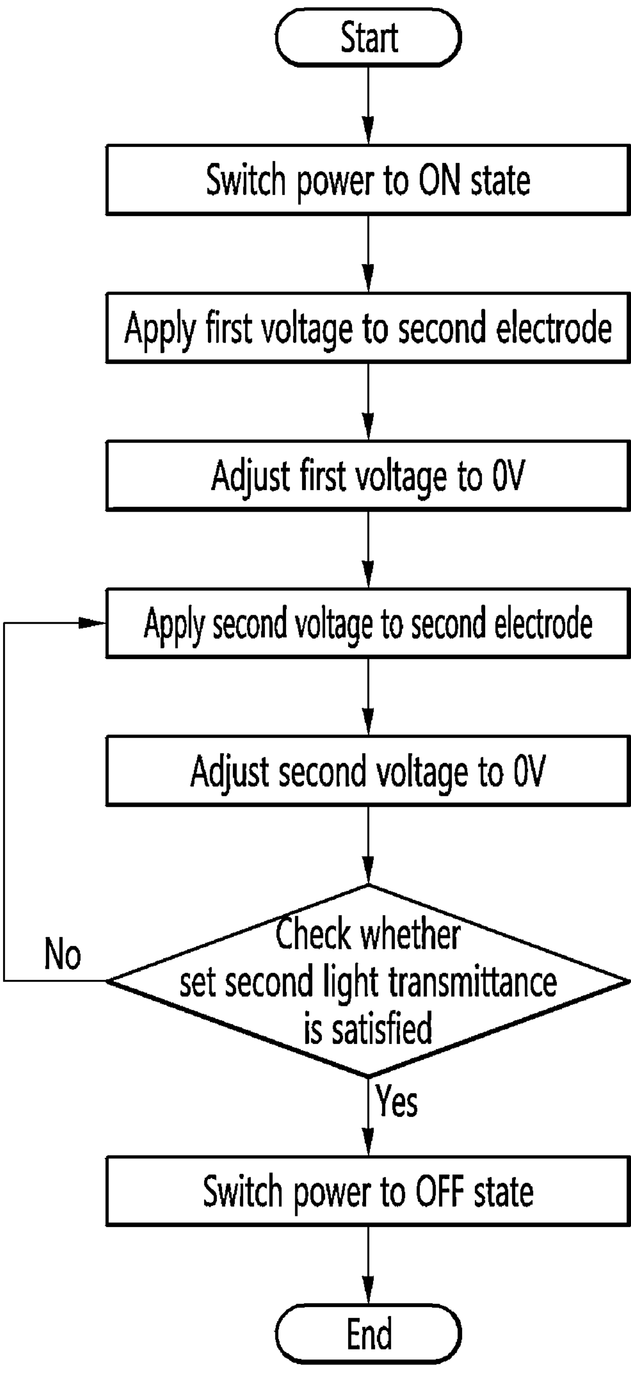

FIG. 6 is a flowchart of a method for driving the optical path control member according to a third embodiment. In the description of the method for driving the optical path control member according to the third embodiment, a description similar to the description of the method for driving the optical path control member according to the embodiments described above will be omitted.

Referring to FIG. 6, a method of driving the optical path control member according to a third embodiment includes a first step of changing power of the optical path control member to an on state, a second-first step of applying a first voltage to a second electrode, a second-second step of adjusting the first voltage to 0V, a third-first step of applying a second voltage to the second electrode, a third-second step of adjusting the second voltage to 0V, a third-third step of checking whether a set second light transmittance is satisfied, and a fourth step of converting power of the optical path control member to an off state. The steps are sequentially performed.

In the first step, the power of the optical path control member 1000 is switched to an on state. Specifically, the power supply of the optical path control member 1000 is switched to an on state. Alternatively, the power supply connected to the optical path control member by the connector is switched to an on state.

Accordingly, the power of the optical path control member 1000 is turned on. Accordingly, it is prepared in a state in which a voltage may be applied to the first electrode or the second electrode.

Subsequently, the second-first step and the second-second step are performed.

In the second-first step, a voltage is applied through a power supply unit of the optical path control member 1000 or an external power supply unit connected to the optical path control member. Specifically, a first voltage having a positive polarity is applied to the second electrode 220, while the first electrode 210 is maintained in a ground electrode state. Accordingly, the light conversion particle 330*b* is moved in a direction toward the first electrode by a repulsive force with the second electrode 220. For example, the first voltage set in the first embodiment described above may be applied to the second electrode 220 for a set application time. For example, a positive voltage of |a|V may be applied to the second electrode 220 for a time of X seconds (x1 seconds or x1+x2 seconds).

Subsequently, the first voltage is converted to 0V. Accordingly, the optical path control member is switched from the first mode, which is the public mode, to the second mode, which is the privacy mode. Subsequently, the optical path control member is switched to the rest mode, which maintains the privacy mode.

Then, a third step proceeds. In the third step, the second voltage applied to the second electrode 220 of the optical path control member 1000 is corrected. Specifically, in the third step, the application time of the second voltage is corrected so that the light transmittance of the optical path control member satisfies the second light transmittance.

The third step may include a third-first step of applying a second voltage to the second electrode, a third-second step of converting the second voltage to 0V, and a third-third step of checking whether a set second light transmittance is satisfied.

In the third-first step, a voltage is applied through a power supply unit of the optical path control member 1000 or an external power supply unit connected to the optical path control member. Specifically, a second voltage having a negative (−) polarity may be applied to the second electrode 220 while the first electrode 210 is maintained in a ground electrode state. Accordingly, the light conversion particles 330*b* are moved and dispersed toward the second electrode by an attractive force with the second electrode 220. For example, the second voltage set in the first embodiment described above may be applied to the second electrode 220 for a set application time. For example, a negative voltage of |b|V may be applied to the second electrode 220 for an application time of Y1 seconds (y1 seconds or y1+y2).

Subsequently, the second voltage is converted to 0V. Accordingly, the optical path control member is switched from the first mode, which is the public mode, to the second mode, which is the privacy mode. Then, the optical path control member switches to a rest mode, which maintains the privacy mode.

Subsequently, in third-third step, it is checked whether the light transmittance in the rest mode satisfies the second light transmittance. The light transmittance is measured with a known luminance meter.

The second light transmittance is defined as a light transmittance implemented in the privacy mode of the optical path control member.

If the light transmittance of the optical path control member satisfies the set second light transmittance, the optical path control member maintains a rest mode, which is a privacy mode.

If the optical path control member does not satisfy the set second light transmittance, the process returns to the third-first step. Subsequently, a second voltage of |b'|V is applied to the second electrode 220 with a time of y3 seconds. Subsequently, the second voltage is converted to 0V. Subsequently, the light transmittance of the optical path control member and the second light transmittance are compared.

When the second light transmittance is satisfied by applying the second voltage of b'|V for a time of y3 seconds, the application time of the second voltage of the optical path control member may be corrected to Y2 seconds (y1+y3 seconds or y1+y2+$y_3$).

That is, the process is repeated until the light transmittance of the optical path control member satisfies a set first light transmittance. Accordingly, when the second voltage of |b'|V is applied, the application time of the second voltage that the optical path control member satisfies the second light transmittance is corrected. Also, the optical path control member maintains a rest mode of a public mode having a second light transmittance.

Figure 7:
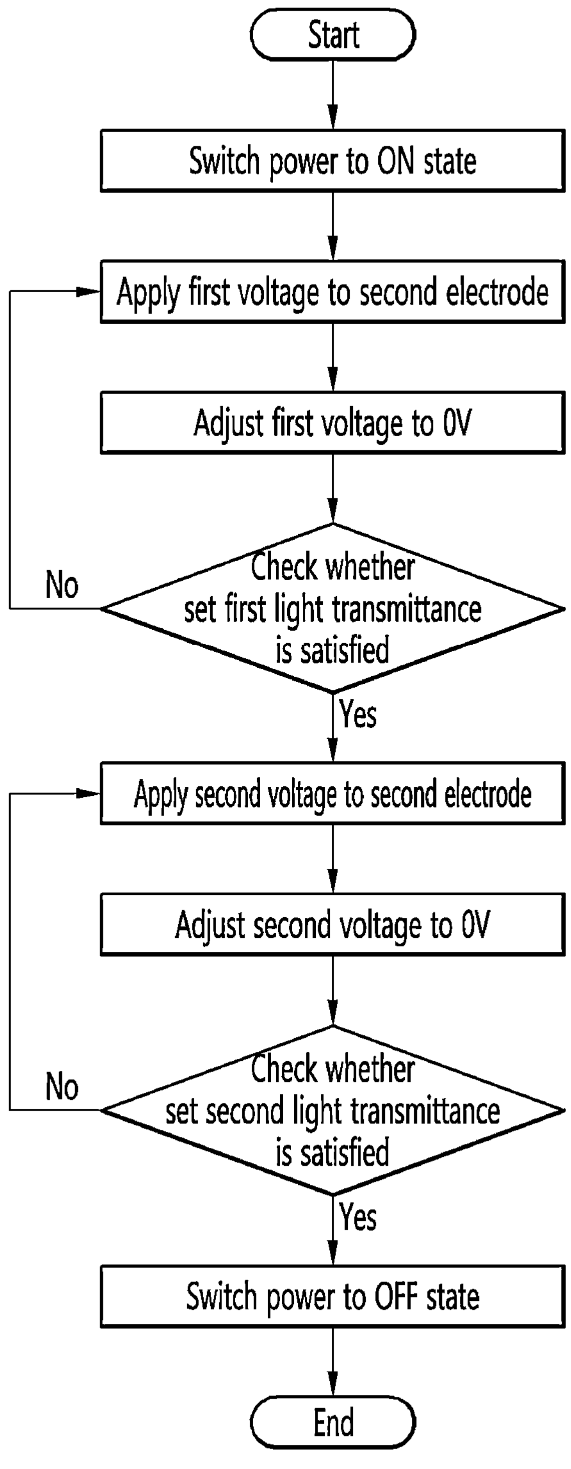

FIG. 7 is a flowchart of a method for driving the optical path control member according to a fourth embodiment. In the description of the method for driving the optical path control member according to the fourth embodiment, a description similar to the description of the method for driving the optical path control member according to the first embodiment described above will be omitted.

Referring to FIG. 7, a method of driving the optical path control member according to a fourth embodiment includes a first step of changing power of the optical path control member to an on state, a second-first step of applying a first voltage to a second electrode, a second-second step of adjusting the first voltage to 0V, a second-third step of checking whether a predetermined first light transmittance is satisfied, a third-first step of applying a second voltage to the second electrode, a third-second step of adjusting the second voltage to 0V, a third-third step of checking whether a predetermined second light transmittance is satisfied, and a fourth step of switching power of the optical path control member to an off state. The steps are sequentially performed.

That is, the method for driving the optical path control member according to the fourth embodiment corrects both the application times of the first voltage and the second voltage.

The step of correcting the application time of the first voltage and the second voltage is the same as the method for driving the optical path control member according to the second and third embodiments described above, and thus the following description will be omitted.

A method of driving the optical path control member according to the second to fourth embodiments includes a step of correcting an application time of at least one of the first voltage and the second voltage. Accordingly, an application time of a voltage may be adjusted in real time while the optical path control member is being driven.

Accordingly, it is possible to inhibit a decrease in the driving characteristics of the optical path control member due to a change in the characteristics of the light conversion particles that changes depending on the environment in which the optical path control member is used or the cycle in which the optical path control member is used.

That is, the light conversion particles may be agglomerated with each other in an environment (e.g., temperature) in which the optical path control member is used or over time. In addition, the size or weight of the light conversion particles may be changed. Accordingly, a moving speed of the light conversion particles may be changed. Accordingly, the light transmittance and driving speed of the optical path control member may be changed.

The method of driving the optical path control member according to the second to fourth embodiments includes a step of correcting the application times of the first voltage and the second voltage. Accordingly, it is possible to inhibit the change in the light transmittance and driving speed of the optical path control member due to the change in characteristics of the light conversion particles. Accordingly, the user can visually recognize the display at a uniform light transmittance. Accordingly, the user's visibility is improved.

Figure 8:
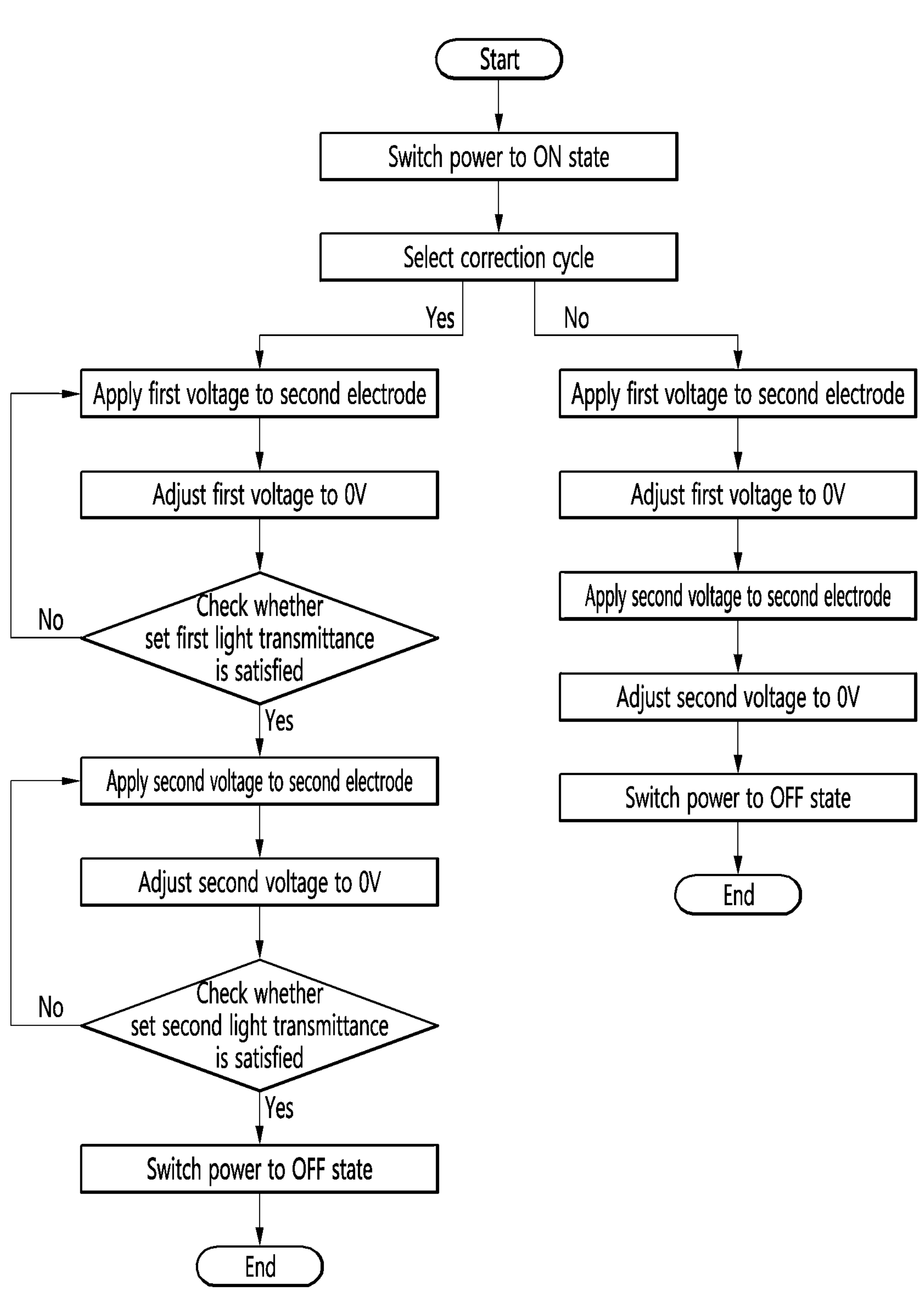

FIG. 8 is a flowchart of a method for driving the optical path control member according to a fifth embodiment and a sixth embodiment. In the description of the method for driving the optical path control member according to the fifth embodiment and the sixth embodiment, a description similar to the description of the method for driving the optical path control member according to the embodiments described above will be omitted.

Referring to FIG. 8, a method of driving the optical path control member according to a fifth embodiment includes a first step of changing power of the optical path control member to an on state, a second step of setting a correction cycle, a third-first step of applying a first voltage to a second electrode, a third-second step of adjusting the first voltage to 0V, a third-third step of checking whether the set first light transmittance is satisfied, a fourth-first step of applying a second voltage to the second electrode, a fourth-second step of adjusting the second voltage to 0V, a fourth-third step of checking whether the set second light transmittance is satisfied, and a fifth step of switching power to an off state.

In the first step, the power of the optical path control member 1000 is switched to an on state. Specifically, the power supply of the optical path control member 1000 is switched to an on state. Alternatively, the power supply connected to the optical path control member by the connector is switched to an on state.

Accordingly, the power of the optical path control member 1000 is turned on. Accordingly, it is prepared in a state in which a voltage may be applied to the first electrode or the second electrode.

Subsequently, the second step proceeds. In the second step, a correction cycle of the voltage is selected. In the second step, whether or not to proceed with correction is preferentially selected. In detail, in the second step, the embodiment can select whether to proceed with voltage correction and the voltage correction cycle.

If it is chosen to perform voltage correction in the second step, the correction cycle may be selected in real time or at a set cycle. In detail, in the selection of the correction cycle of the voltage, a correction cycle of one week, one month, or one year may be set. The optical path control member may correct a first voltage and/or a second voltage according to a set correction cycle.

When the correction cycle of the voltage is selected, the method of driving the optical path control member according to the fifth embodiment may perform correction steps of the first voltage and the second voltage according to the fourth embodiment described above. However, the fifth embodiment is not limited thereto. Specifically, in the fifth embodiment, only the correction step of the first voltage according to the second embodiment may be performed. Alternatively, in the fifth embodiment, only the correction step of the second voltage according to the third embodiment may be performed.

Since the correction step of the first voltage and the second voltage is the same as the method of driving the optical path control member according to the second to fourth embodiments, the following description will be omitted.

Referring to FIG. 8, the method of driving the optical path control member according to the sixth embodiment does not perform correction in the correction cycle selection step.

If the correction is not performed in the correction cycle selection step, the correction of at least one of the first voltage and the second voltage is not performed. Although FIG. 8 illustrates a case in which both the first voltage and the second voltage are not corrected, the embodiment is not limited thereto. That is, in the sixth embodiment, the first voltage may be corrected and the second voltage may not be corrected. Alternatively, the first voltage may not be corrected, and the second voltage may be corrected.

If the correction of the first voltage and the second voltage is not performed, a first voltage and a second voltage are applied to the optical path control member. Accordingly, the optical path control member may be sequentially switched to the initial mode, the first mode, the rest mode, the second mode and the rest mode.

The method of driving the optical path control member according to the fifth and sixth embodiments includes a step of selecting a correction cycle of the voltage. Accordingly, the optical path control member may be used while correcting the voltage in real time according to the user's selection. Alternatively, the optical path control member may be used without correcting the voltage according to the user's selection. Alternatively, the optical path control member may be used while correcting the voltage at a set cycle according to the user's selection.

Accordingly, when the user needs to immediately use the optical path control member, the optical path control member may be used without correction. Alternatively, when the user wants to use the optical path control member at a light transmittance suitable for each mode, the optical path control member may be used while correcting the voltage in real time. Alternatively, when the user wants to use the optical path control member while regularly correcting the optical path control member, the optical path control member may be used by selecting a desired correction cycle.

Accordingly, the user may use the optical path control member in various methods according to the environment and selection of the user.

Figure 9:
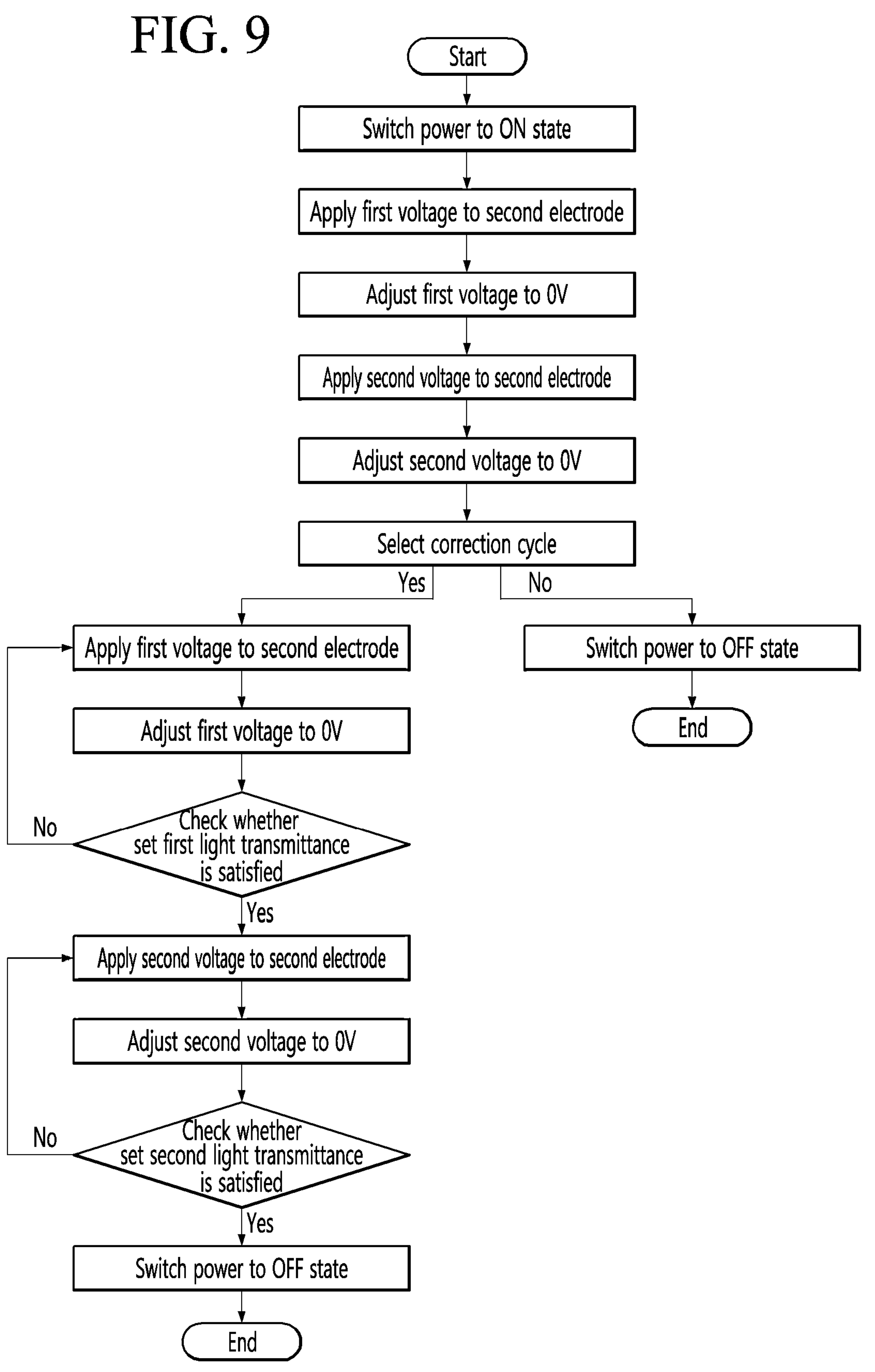

FIG. 9 is a flowchart of a method for driving the optical path control member according to a seventh embodiment and a eighth embodiment. In the description of the method for driving the optical path control member according to the seventh embodiment and the eighth embodiment, a description similar to the description of the method for driving the optical path control member according to the embodiments described above will be omitted.

Referring to FIG. 9, a method of driving the optical path control member according to the seventh embodiment includes a first step of changing power of the optical path control member to an on state, a second-first step of applying a first voltage to a second electrode, a second-second step of adjusting a first voltage to 0V, a third-first step of applying a second voltage to the second electrode, a third-second step of applying a second voltage to 0V, a fourth step of setting a correction cycle, a fifth-first step of applying a first voltage to the second electrode, a fifth-second step of adjusting the first voltage to 0V, a fifth-third step of checking whether the set first light transmittance is satisfied, a sixth-first step of applying a second voltage to the second electrode, a sixth-second step of adjusting the second voltage to 0V, a sixth-third step of checking whether the set second light transmittance is satisfied, and a seventh step of switching power of the optical path control member to an off state. The steps may be sequentially performed.

In the first step, the power of the optical path control member 1000 is switched to an on state. Specifically, the power of the optical path control member in the initial mode is switched to the on state. For example, the power supply unit of the optical path control member 1000 is switched to the on state. Alternatively, the power supply unit connected to the optical path control member by the connector is switched to the on state.

Accordingly, the power of the optical path control member 1000 is turned on. Accordingly, it is prepared in a state in which a voltage may be applied to the first electrode or the second electrode.

Subsequently, the second-first step and the second-second step are performed.

In the second-first step, a voltage is applied through a power supply unit of the optical path control member 1000 or an external power supply unit connected to the optical path control member. Specifically, a first voltage having a positive (+) polarity is applied to the second electrode 220 while the first electrode 210 is maintained in a ground electrode state. Accordingly, the light conversion particle 330*b* is moved in a direction toward the first electrode by a repulsive force with the second electrode 220. For example, a positive voltage of |a|V may be applied to the second electrode 220 for a time of X1 seconds (x1 seconds or x1+x2 seconds).

Subsequently, the first voltage is converted to 0V. Accordingly, the optical path control member is switched from the first mode, which is the public mode, to the second mode, which is the privacy mode. Subsequently, the optical path control member is switched to the rest mode, which maintains the privacy mode.

Subsequently, the third-first step and the third-second step are performed.

In the third-first step, a voltage is applied through a power supply unit of the optical path control member 1000 or an external power supply unit connected to the optical path control member. Specifically, a first voltage having a negative (−) polarity is applied to the second electrode 220 while the first electrode 210 is maintained in a ground electrode state. Accordingly, the light conversion particles 330*b* are moved are dispersed in the direction toward the second electrode by an attractive force with the second electrode 220. For example, a negative voltage of |b|V may be applied to the second electrode 220. For example, a negative voltage of b|V may be applied to the second electrode 220 for a time of application of Y1 seconds (y1 second or y1+y2 seconds).

Subsequently, the second voltage may be converted to 0V. Accordingly, the optical path control member is switched from the first mode, which is the public mode, to the second mode, which is the privacy mode. Subsequently, the optical path control member is switched to the rest mode, which maintains the privacy mode.

Subsequently, the fourth step proceeds. In the fourth step, a correction cycle of the voltage is selected. For example, in the fourth step, whether to proceed with correction is selected first. In detail, in the fourth step, whether to proceed with correction of the voltage and a correction cycle of the voltage may be selected.

If the embodiment is selected to proceed with voltage correction in the fourth step, the correction cycle may be selected in real time or at a set cycle. In detail, a correction cycle of one week, one month, or one year may be set in the selection of the correction cycle of the voltage. The optical path control member may correct a first voltage and/or a second voltage according to a set correction cycle.

If the correction cycle of the voltage is selected, the driving method of the optical path control member according to the seventh embodiment may perform the correction steps of the first voltage and the second voltage according to the fourth embodiment described above. However, the seventh embodiment is not limited thereto. Specifically, in the seventh embodiment, only the correction step of the first voltage according to the second embodiment may be performed. Alternatively, in the seventh embodiment, only the correction step of the second voltage according to the third embodiment may be performed.

Since the correction step of the first voltage and the second voltage is the same as the method of driving the optical path control member according to the second to fourth embodiments, the following description will be omitted.

Referring to FIG. 9, a method of driving the optical path control member according to the eighth embodiment includes a first step of changing power of the optical path control member to an on state, a second-first step of applying a first voltage to a second electrode, a second-second step of applying a first voltage to 0V, a third-first step of applying a second voltage to the second electrode, a third-second step of adjusting a second voltage to 0V, a fourth step of setting a correction cycle, and a fifth step of switching power of the optical path control member to an off state. The steps may be sequentially performed.

In the driving method of the optical path control member according to the eighth embodiment, a correction cycle is not selected in the step of setting a correction cycle. That is, in the step of setting the correction cycle, correction is not performed. Accordingly, the power of the optical path control member is turned off.

In the method for driving the optical path control member according to the seventh and eighth embodiments, the voltage may be corrected after the user uses the optical path control member. After using the optical path control member, the user may recognize that a suitable light transmittance does not come out in the first mode and the second mode. In this case, the correction cycle may be set. That is, the user may proceed with the correction by selecting the real-time correction or the correction cycle. Subsequently, the power of the optical path control member may be turned off.

Accordingly, when the optical path control member is used later, the user may use the optical path control member at a light transmittance suitable for the first mode and the second mode.

Figure 10:
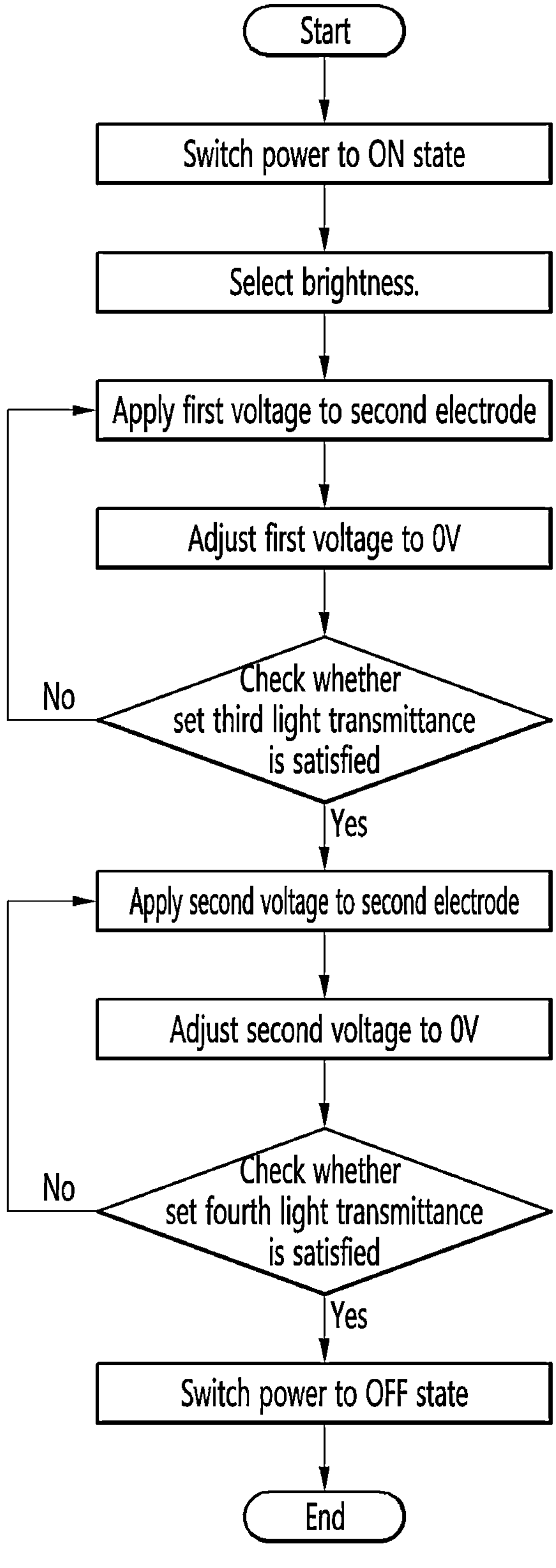

FIG. 10 is a flowchart of a method for driving the optical path control member according to a ninth embodiment. In the description of the method for driving the optical path control member according to the ninth embodiment, a description similar to the description of the method for driving the optical path control member according to the first to eight embodiments described above will be omitted.

Referring to FIG. 10, a method of driving the optical path control member according to the ninth embodiment includes a first step of changing power of the optical path control member to an on state, a second step of selecting brightness, a third-first step of applying a first voltage to a second electrode, a third-second step of adjusting the first voltage to 0V, a third-third step of checking whether the set third light transmittance is satisfied, a fourth-first step of applying a second voltage to the second electrode, a fourth-second step of adjusting the second voltage to 0V, a fourth-third step of checking whether a fourth optical path control member is satisfied, and a fifth step of switching power to an off state. The steps are sequentially performed.

In the first step, the power of the optical path control member 1000 is switched to an on state. Specifically, the power of the optical path control member in the initial mode is switched to the on state. For example, the power supply unit of the optical path control member 1000 is switched to the on state. Alternatively, the power supply unit connected to the optical path control member by the connector is switched to the on state.

Accordingly, the power of the optical path control member 1000 is turned on. Accordingly, it is prepared in a state in which a voltage may be applied to the first electrode or the second electrode.

Subsequently, a second step proceeds. In the second step, the light transmittance of the optical path control member is selected. For example, the brightness level of first to fifth levels is defined. The user selects the brightness level of the first to fifth levels in the second step. The brightness level is defined by the light transmittance of the optical path control member.

Subsequently, the third-first step, the third-second step and the third-third step are performed.

In the third-first step, a voltage is applied through a power supply unit of the optical path control member 1000 or an external power supply unit connected to the optical path control member. Specifically, a first voltage having a positive (+) polarity is applied to the second electrode 220 while the first electrode 210 is maintained in a ground electrode state. Accordingly, the light conversion particle 330*b* is moved in a direction toward the first electrode by a repulsive force with the second electrode 220. A first voltage is applied to the second electrode according to brightness previously selected. For example, a positive voltage of |a|V may be applied to the second electrode 220 for a time of X1 seconds (x1 seconds or x1+x2 seconds).

For example, the first voltage set in the first embodiment described above may be applied to the second electrode 220 for a set application time.

Subsequently, the first voltage is converted to 0V. Accordingly, the optical path control member is switched from the initial mode which is the privacy mode to the first mode which is the public mode. Subsequently, the optical path control member is switched to the rest mode which maintains the public mode.

Subsequently, in the third-third step, whether the light transmittance in the rest mode satisfies the third light transmittance is determined. The light transmittance is measured with a known luminance meter.

The third light transmittance is defined as a light transmittance of brightness selected in the brightness selection step. That is, when the brightness of the first mode is selected as the brightness of the first level in the brightness selection step, the third light transmittance may be the light transmittance of the brightness of the first level. Alternatively, when the brightness of the first mode is selected as the brightness of the second level in the brightness selection step, the third light transmittance may be the light transmittance of the brightness of the second level.

If the optical path control member satisfies the selected third light transmittance, the optical path control member maintains the rest mode, which is the public mode.

If the optical path control member does not satisfy the selected third light transmittance, the process returns to the third-first step. Subsequently, the voltage magnitude of the first voltage applied to the second electrode 220 is changed. Alternatively, the first voltage is further applied. Subsequently, the first voltage is converted to 0V Subsequently, the light transmittance of the optical path control member and the third light transmittance are compared.

That is, the process is repeated until the optical path control member satisfies a set third light transmittance. Accordingly, when the first voltage is applied, the optical path control member is corrected to the magnitude or application time of the first voltage that satisfies the third light transmittance. Subsequently, the optical path control member maintains the rest mode of the public mode having a third light transmittance.

Subsequently, the fourth-first step, the fourth-second step and the fourth-third step are performed.

In the fourth-first step, a voltage is applied through a power supply unit of the optical path control member 1000 or an external power supply unit connected to the optical path control member. Specifically, a second voltage having a negative (−) polarity is applied to the second electrode 220 while the first electrode 210 is maintained in a ground electrode state. Accordingly, the light conversion particles 330*b* are moved and dispersed in a direction toward the second electrode by an attraction with the second electrode 220. For example, a negative voltage of |b|V may be applied to the second electrode 220 for an application time of Y seconds (y1 seconds or y1+y2 seconds).

For example, the second voltage set in the first embodiment described above may be applied to the second electrode 220 at a set application time.

Subsequently, the second voltage is converted to 0V. Accordingly, the optical path control member is switched from the first mode, which is the public mode, to the second mode, which is the privacy mode. Subsequently, the optical path control member is switched to the rest mode, which maintains the privacy mode.

Subsequently, in the fourth-third step, whether the light transmittance in the rest mode satisfies the fourth light transmittance is determined. The light transmittance is measured with a known luminance meter.

The fourth light transmittance is defined as a light transmittance of brightness selected in the brightness selection step. That is, when the brightness of the second mode is selected as the brightness of the fourth level in the brightness selection step, the fourth light transmittance may be the light transmittance of the brightness of the fourth level. Alternatively, when the brightness of the second mode is selected as the brightness of the fifth level in the brightness selection step, the fourth light transmittance may be the light transmittance of the brightness of the fifth level.

If the optical path control member satisfies the selected fourth light transmittance, the optical path control member may maintain a privacy mode, which is a rest mode.

If the optical path control member does not satisfy the selected fourth light transmittance, the process returns to the fourth-first step. Subsequently, the voltage magnitude of the second voltage applied to the second electrode 220 is changed. Alternatively, the second voltage is further applied. Then, the second voltage is converted to 0V. Subsequently, the light transmittance of the optical path control member and the fourth light transmittance are compared.

That is, the process is repeated until the optical path control member satisfies a set fourth light transmittance. Accordingly, when the second voltage is applied, the optical path control member is corrected to the magnitude or application time of the second voltage that satisfies the fourth light transmittance. Subsequently, the optical path control member maintains a rest mode of a privacy mode having a fourth light transmittance.

The optical path control member according to the ninth embodiment allows a user to select the brightness in each mode before driving the optical path control member. Furthermore, the optical path control member according to the ninth embodiment corrects the magnitude or application time of at least one of the first voltage and the second voltage to satisfy the light transmittance according to the brightness.

Depending on the usage environment of the light path control member, the user can use the light path control member with different brightnesses. For example, in a bright environment, the optical path control member can be used with the brightness brightened. Or, in a dark environment, the optical path control member can be used with the brightness darkened.

Accordingly, the optical path control member according to the ninth embodiment may select the brightness of the optical path control member according to the user's usage environment.

In addition, voltage magnitudes of the first voltage and the second voltage vary according to the selection of the brightness. Accordingly, the optical path control member is driven with low power in an environment in which the brightness of the optical path control member is used darkly. Accordingly, power consumption of the optical path control member may be reduced. In addition, a life of the optical path control member can be increased.

Hereinafter, a display device and a display device to which an optical path control member according to an embodiment is applied will be described with reference to FIGS. 11 to 15.

Figure 11:
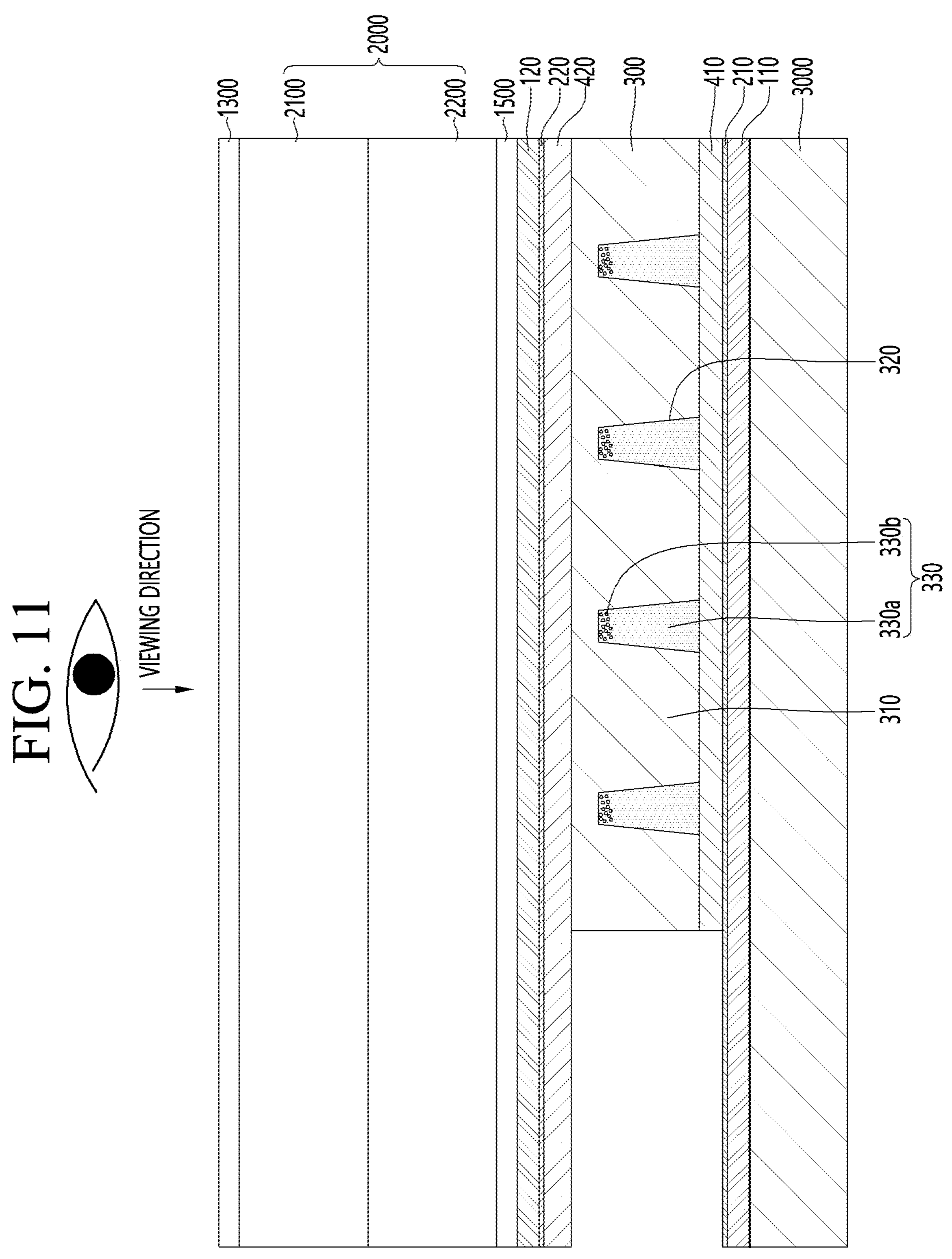
FIGS. 11 and 12 are cross-sectional views of a display device to which an optical path control member according to an embodiment is applied.
Figure 12:
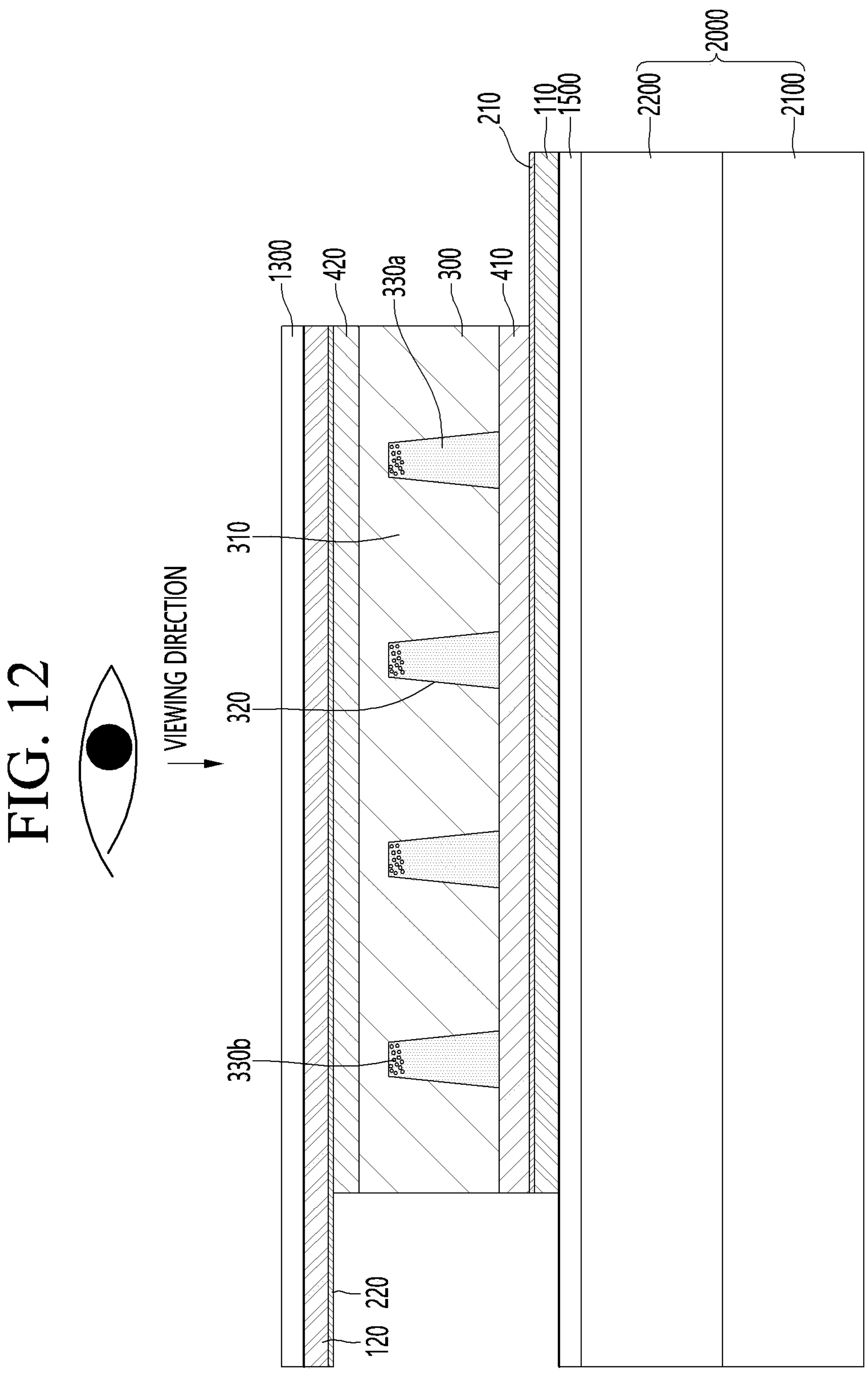

Referring to FIGS. 11 and 12, the optical path control member 1000 according to the embodiment may be disposed on or below the display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer including an optical transparent adhesive material.

The adhesive layer 1500 may include a release film. In detail, when adhering the optical path control member and the display panel, the optical path control member and the display panel may be adhered after the release film is removed.

The display panel 2000 may include a first base substrate 2100 and a second base substrate 2200. When the display panel 2000 is a liquid crystal display panel, the optical path control member may be formed under the liquid crystal panel. That is, when a surface viewed by the user in the liquid crystal panel is defined as an upper portion of the liquid crystal panel, the optical path control member may be disposed under the liquid crystal panel. The display panel 2000 may be formed in a structure in which the first base substrate 2100 including a thin film transistor (TFT) and a pixel electrode and the second base substrate 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first base substrate 2100 and the second base substrate 2200 is bonded to the first base substrate 2100 with the liquid crystal layer interposed therebetween. That is, a thin film transistor may be formed on the first base substrate 2100, a protective film may be formed on the thin film transistor, and a color filter layer may be formed on the protective film. In addition, a pixel electrode in contact with the thin film transistor may be formed on the first base substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 11, the optical path control member may be disposed under the liquid crystal panel and on the backlight unit 3000, and the optical path control member may be disposed between the backlight unit 3000 and the display panel 2000.

Alternatively, as shown in FIG. 12, when the display panel 2000 is an organic light emitting diode panel, the optical path control member may be formed on the organic light emitting diode panel. That is, when the surface viewed by the user in the organic light emitting diode panel is defined as an upper portion of the organic light emitting diode panel, the optical path control member may be disposed on the organic light emitting diode panel. The display panel 2000 may include a self-luminous element that does not require a separate light source. In the display panel 2000, a thin film transistor may be formed on the first base substrate 2100, and an organic light emitting element in contact with the thin film transistor may be formed. The organic light emitting element may include an anode, a cathode, and an organic light emitting layer formed between the anode and the cathode. In addition, the second base substrate 2200 configured to function as an encapsulation substrate for encapsulation may be further included on the organic light emitting element.

In addition, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting diode panel, the polarizing plate may be the external light reflection inhibiting polarizing plate.

In addition, an additional functional layer 1300 such as an anti-reflection layer, an anti-glare, or the like may be further disposed on the optical path control member 1000. Specifically, the functional layer 1300 may be adhered to one surface of the first substrate 110 of the optical path control member. Although not shown in drawings, the functional layer 1300 may be adhered to the first substrate 110 of the optical path control member via an adhesive layer. In addition, a release film for protecting the functional layer may be further disposed on the functional layer 1300.

Further, a touch panel may be further disposed between the display panel and the optical path control member.

It is shown in the drawings that the optical path control member is disposed at an upper portion of the display panel, but the embodiment is not limited thereto, and the optical path control member may be disposed at various positions such as a position in which light is adjustable, that is, a lower portion of the display panel, or between a second substrate and a first substrate of the display panel, or the like.

In addition, it is shown in the drawings that the light conversion unit of the optical path control member according to the embodiment is in a direction parallel or perpendicular to an outer surface of the second substrate, but the light conversion unit is formed to be inclined at a predetermined angle from the outer surface of the second substrate. Through this, a moire phenomenon occurring between the display panel and the optical path control member may be reduced.

Figure 13:
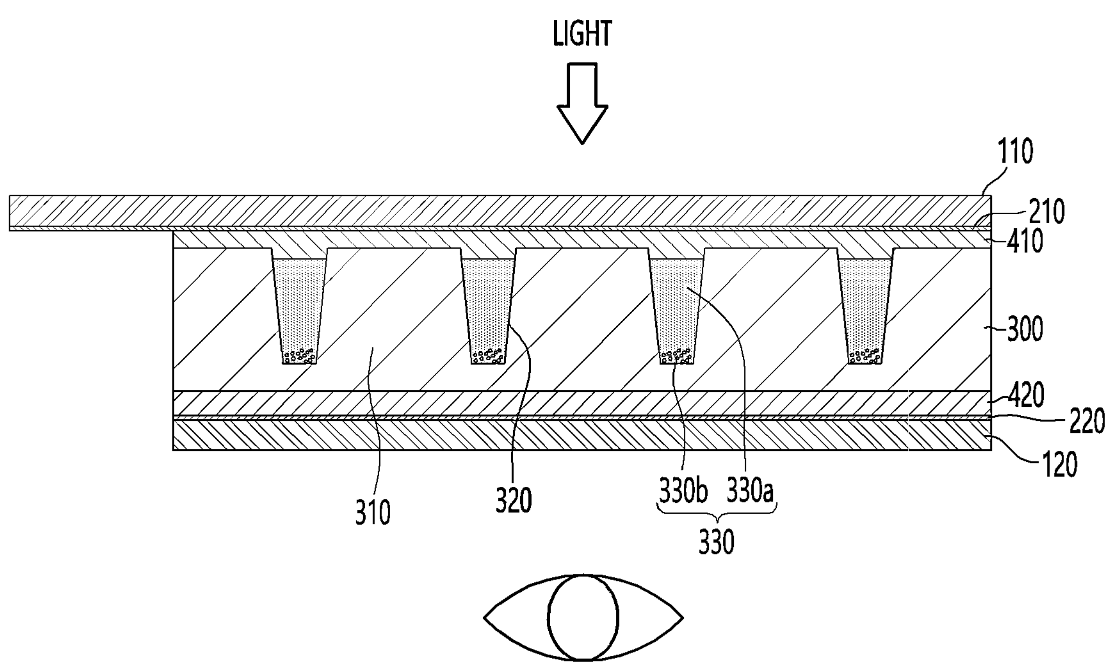
FIGS. 13 to 15 are views for describing one embodiment of the display device to which the optical path control member according to the embodiment is applied.
Figure 13:
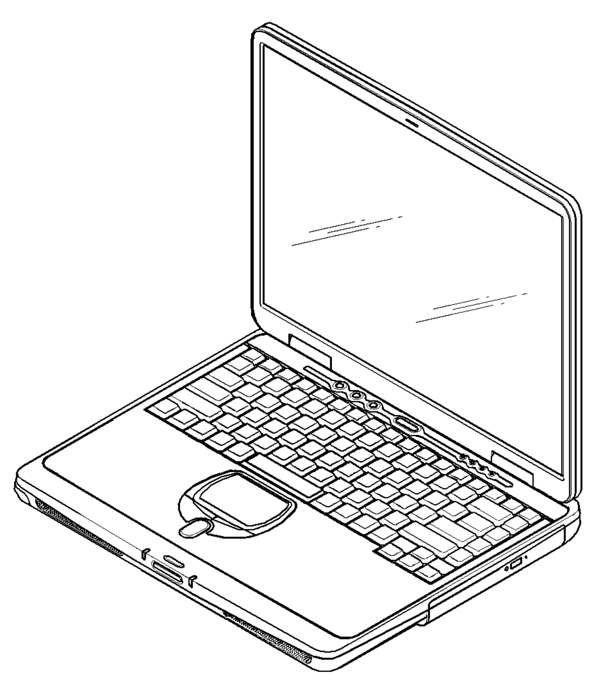
Figure 14:
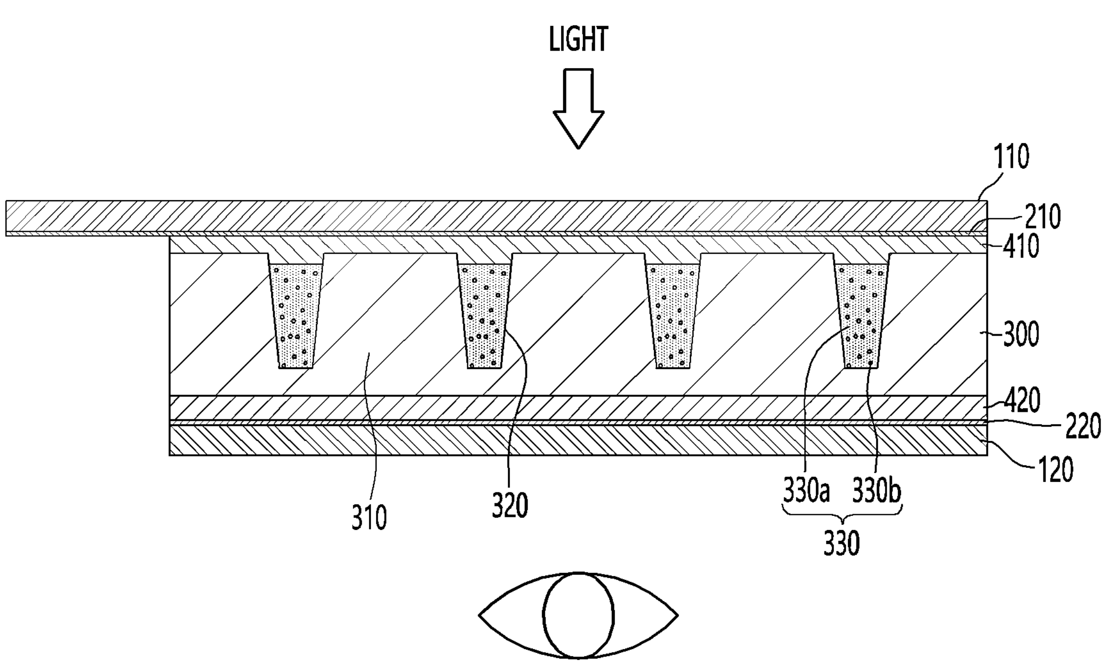
Figure 14:
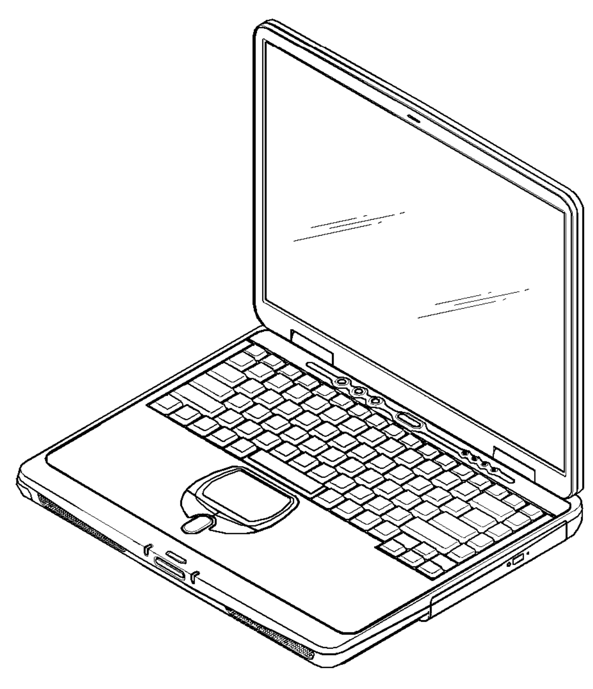
Figure 15:
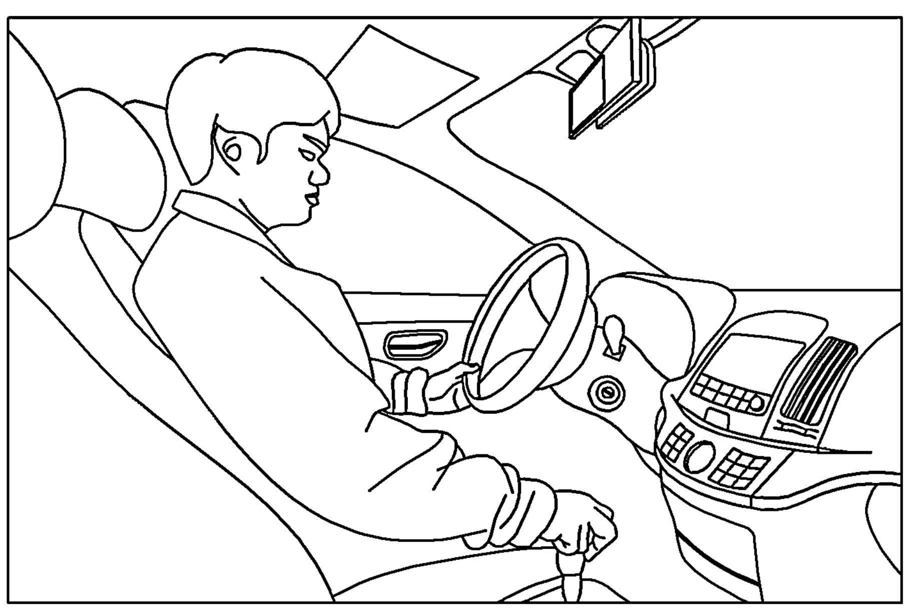

Referring to FIGS. 13 to 15, an optical path control member according to an embodiment may be applied to various display devices.

Referring to FIGS. 13 to 15, the optical path control member according to an embodiment may be applied to a display device that displays a display.

For example, when power is applied to the optical path control member as shown in FIG. 13, the receiving part functions as the light transmitting part, so that the display device may be driven in the public mode, and when power is not applied to the optical path control member as shown in FIG. 14, the receiving part functions as the light blocking part, so that the display device may be driven in the light blocking mode.

Accordingly, a user may easily drive the display device in a privacy mode or a normal mode according to application of power.

Light emitted from the backlight unit or the self-luminous element may move from the first substrate toward the second substrate. Alternatively, the light emitted from the backlight unit or the self-luminous element may also move from the second substrate toward the first substrate.

In addition, referring to FIG. 15, the display device to which the optical path control member according to the embodiment is applied may also be applied inside a vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle.

In addition, the optical path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A method of driving an optical path control member comprising:

a first step of turning on a power of the optical path control member in an initial mode;

a second step of setting an application time of a first voltage applied to the optical path control member; and a third step of setting an application time of a second voltage applied to the optical path control member, wherein the second step includes:

applying the first voltage of |a|V for $x_1$ seconds;

determining whether a set first light transmittance is satisfied; and if the first light transmittance is not satisfied, applying the first voltage of |a|V for $x_2$ seconds, wherein the third step includes:

applying the second voltage of |b|V for $y_1$ seconds;

determining whether a set second light transmittance is satisfied; and if the second light transmittance is not satisfied, applying the second voltage of |b|V for $y_2$ seconds, wherein the first voltage and the second voltage are voltages having different polarities, and the optical path control member is switched to a public mode when the first voltage is applied, and is switched to a privacy mode when the second voltage is applied, and wherein the determining whether the first light transmittance is satisfied includes:

if a light transmittance is 60% or more in a region where a user's field of view exceeds 45°, determining that the first light transmittance is satisfied; and if a light transmittance is less than 60% in the region where the user's field of view exceeds 45°, determining that the first light transmittance is not satisfied.

2. The method of claim 1, wherein the application time of the first voltage is set to $x_1$ or $x_1+x_2$ seconds, and wherein the application time of the second voltage is set to $y_1$ or $y_1+y_2$ seconds.

3. The method of claim 1, wherein the determining whether the second light transmittance is satisfied includes:

if a light transmittance is less than 10% in a region where the user's field of view is less than 45°, determining that the second light transmittance is satisfied, and if a light transmittance is 10% or more in the region where the user's field of view exceeds 45°, determining that the second light transmittance is not satisfied.

4. The method of claim 3, comprising:

if the first light transmittance is satisfied, adjusting the first voltage to 0V and applying the voltage of 0V for a predetermined time before the third step is started, and wherein the optical path control member is switched to a first rest mode that maintains the public mode as the first voltage is adjusted to 0V.

5. The method of claim 4, comprising:

if the second light transmittance is satisfied, adjusting the second voltage to 0V and applying the voltage of 0V for a predetermined time, and wherein the optical path control member is switched to a second rest mode that maintains the privacy mode as the first voltage is adjusted to 0V.

6. A method of driving an optical path control member comprising:

a first step of turning on a power of the optical path control member in an initial mode;

a second step of correcting an application time of a first voltage applied to the optical path control member or a third step of correcting an application time of a second voltage applied to the optical path control member, wherein the second step includes:

step of applying the first voltage of |a|V for $x_1$ seconds;

converting the first voltage to 0V;

determining whether a set first light transmittance is satisfied; and if the first light transmittance is not satisfied, applying the first voltage of |a|V for $x_3$ seconds, wherein the third step includes:

step of applying the second voltage of |b|V for $y_1$ seconds;

converting the second voltage to 0V;

determining whether a set second light transmittance is satisfied; and if the second light transmittance is not satisfied, applying the second voltage of |b|V for $y_3$ seconds, wherein the first voltage and the second voltage are voltages having different polarities, and the optical path control member is switched to a public mode when the first voltage is applied, and is switched to a privacy mode when the second voltage is applied.

7. The method of claim 6, wherein the first voltage is corrected to $x_2$ seconds ($x_1$ seconds+$x_3$ seconds), and wherein the second voltage is corrected to $y_2$ seconds ($y_1$ seconds+$y_3$ seconds).

8. The method of claim 7, wherein the determining whether the first light transmittance is satisfied includes:

if a light transmittance is 60% or more in a region where a user's field of view exceeds 45°, determining that the first light transmittance is satisfied, and if a light transmittance is less than 60% in the region where the user's field of view exceeds 45°, determining that the first light transmittance is not satisfied.

9. The method of claim 8, wherein the determining whether the second light transmittance is satisfied includes:

if a light transmittance is less than 10% in a region where the user's field of view is less than 45°, determining that the second light transmittance is satisfied, and if a light transmittance is 10% or more in the region where the user's field of view exceeds 45°, determining that the second light transmittance is not satisfied.

10. The method of claim 9, comprising:

if the first light transmittance is satisfied, adjusting the first voltage to 0V and applying the voltage of 0V for a predetermined time before the third step is started, and wherein the optical path control member is switched to a first rest mode that maintains the public mode as the first voltage is adjusted to 0V.

11. The method of claim 10, comprising:

if the second light transmittance is satisfied, adjusting the second voltage to 0V and applying the voltage of 0V for a predetermined time, and wherein the optical path control member is switched to a second rest mode that maintains the privacy mode as the first voltage is adjusted to 0V.

12. The method of claim 6, comprising:

setting a voltage correction cycle of the optical path control member before applying the first voltage according to the second step, and wherein the correction of at least one of the first voltage and the second voltage is performed when setting of the correction cycle is set to perform correction of at least one of the first voltage and the second voltage.

13. The method of claim 12, wherein the correction of the first voltage and the second voltage is set not to proceed, the step of determining whether the first light transmittance is satisfied and the step of determining whether the second light transmittance is satisfied are omitted.

14. The method of claim 6, comprising:

applying a first voltage of |a|V for $x_1$ seconds before performing the second step;

converting the first voltage to 0V before performing the second step;

applying a second voltage of |b|V for $y_1$ seconds before performing the second step;

converting the second voltage to 0V before performing the second step; and setting a voltage correction cycle of the optical path control member before performing the second step, and wherein the second step and the third step are performed when the setting of the voltage correction cycle sets that at least one of the first voltage and the second voltage is to be corrected.

15. The method of claim 14, comprising:

if the setting of the voltage correction cycle sets that correction of the first voltage and the second voltage is not performed, turning off the power of the optical path control member without performing the second step and the third step.

16. A method of driving an optical path control member comprising:

a first step of turning on a power of on the optical path control member in an initial mode;

a second step of selecting a brightness of the optical path control member;

a third-first step of applying a first voltage satisfying a third light transmittance according to the selected brightness;

a third-second step of converting the first voltage to 0V;

a fourth-first step of applying a second voltage satisfying a fourth light transmittance according to the selected brightness; and a fourth-second step of converting the second voltage to 0 V, wherein the method comprises:

if the third light transmittance is not satisfied after the third-second step, applying the first voltage or a voltage having a different magnitude from the first voltage; and if the fourth light transmittance is not satisfied after the fourth-second step, applying the second voltage or a voltage having a different magnitude from the second voltage.

* * * * *